US011918539B2

(12) United States Patent
Suarez et al.

(10) Patent No.: US 11,918,539 B2
(45) Date of Patent: Mar. 5, 2024

(54) WEARABLE HEALTH MANAGEMENT SYSTEM

(71) Applicant: Welch Allyn, Inc., Skaneateles Falls, NY (US)

(72) Inventors: Carlos Suarez, Syracuse, NY (US); Edward Bremer, Penfield, NY (US); Aaron R. Burnham, Auburn, NY (US); Ashu Jain, Roanoke, VA (US); John Lane, Weesport, NY (US); Christopher Larson, Syracuse, NY (US); Rachel K. Douglas, Latrobe, PA (US); Thaddeus J. Wawro, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 156 days.

(21) Appl. No.: 17/341,715

(22) Filed: Jun. 8, 2021

(65) Prior Publication Data

US 2021/0386615 A1 Dec. 16, 2021

Related U.S. Application Data

(60) Provisional application No. 63/037,140, filed on Jun. 10, 2020.

(51) Int. Cl.
*A61H 9/00* (2006.01)

(52) U.S. Cl.
CPC ......... *A61H 9/0092* (2013.01); *A61H 9/0057* (2013.01); *A61H 2201/0207* (2013.01); *A61H 2201/1207* (2013.01); *A61H 2201/1619* (2013.01); *A61H 2201/165* (2013.01); *A61H 2201/5097* (2013.01); *A61H 2205/06* (2013.01);

(Continued)

(58) Field of Classification Search
CPC ........ A61H 9/00; A61H 9/005; A61H 9/0078; A61H 9/0092; A61H 9/0057; A61H 2201/1238; A61H 2201/165; A61H 2205/065; A61H 2205/067;

(Continued)

(56) References Cited

U.S. PATENT DOCUMENTS 3,454,010 A 7/1969 Lilligren et al.
5,976,099 A 11/1999 Kellogg (Continued)

FOREIGN PATENT DOCUMENTS

CN 101879117 B 7/2012
CN 108542734 A 9/2018

(Continued)

*Primary Examiner* — Samchuan C Yao
*Assistant Examiner* — Nathan M Le
(74) *Attorney, Agent, or Firm* — Price Heneveld LLP

(57) ABSTRACT

A wearable health management system includes a flexible member configured to be worn on an affected area by a patient. At least one actuator is operably coupled to the flexible member. The at least one actuator is configured to be adjusted between a deployed state and a non-deployed state. At least one of a photoplethysmogram sensor and a bio-impedance sensor is coupled to the flexible member to obtain one or more health metrics from the patient. A controller is in communication with the at least one actuator. The controller is configured to adjust the at least one actuator to the deployed state to provide a selected pressure to the affected area.

19 Claims, 11 Drawing Sheets

(52) U.S. Cl.
CPC .... *A61H 2205/106* (2013.01); *A61H 2209/00* (2013.01); *A61H 2230/255* (2013.01); *A61H 2230/655* (2013.01)

(58) Field of Classification Search
CPC .......... A61H 2205/102; A61H 2209/00; A61H 1/00; F04B 19/006; F04B 19/04; F04B 43/02
See application file for complete search history.

(56) References Cited

U.S. PATENT DOCUMENTS

| | | | | |
|---|---|---|---|---|
| 6,010,471 | A | 1/2000 | Ben-Noon | |
| 6,179,796 | B1 | 1/2001 | Waldridge | |
| 7,063,676 | B2 | 6/2006 | Barak | |
| 7,135,007 | B2 | 11/2006 | Scott et al. | |
| 7,354,410 | B2 | 4/2008 | Perry et al. | |
| 8,079,969 | B2 | 12/2011 | Rousso et al. | |
| 8,523,794 | B2 | 9/2013 | Iker et al. | |
| 8,652,059 | B2 | 2/2014 | Sano et al. | |
| 8,764,689 | B2 | 7/2014 | Toth | |
| 8,827,936 | B1 | 9/2014 | Adaie | |
| 9,211,071 | B2 | 12/2015 | Sano et al. | |
| 10,076,462 | B2 | 9/2018 | Johnson et al. | |
| 10,172,757 | B2 | 1/2019 | Kazanchyan et al. | |
| 10,362,968 | B2 | 7/2019 | Zhu et al. | |
| 10,492,974 | B2 | 12/2019 | Chase et al. | |
| 2002/0022791 | A1 | 2/2002 | Morris et al. | |
| 2006/0287621 | A1 | 12/2006 | Atkinson et al. | |
| 2008/0097230 | A1 | 4/2008 | Marks et al. | |
| 2008/0195018 | A1 | 8/2008 | Larson et al. | |
| 2011/0009757 | A1 | 1/2011 | Sano et al. | |
| 2011/0054366 | A1 | 3/2011 | Smith et al. | |
| 2011/0082401 | A1 | 4/2011 | Iker et al. | |
| 2012/0065561 | A1* | 3/2012 | Ballas | A61H 9/0092 601/152 |
| 2014/0276289 | A1* | 9/2014 | Mansur, Jr. | A61H 9/0092 601/151 |
| 2014/0276294 | A1 | 9/2014 | Mansur, Jr. et al. | |
| 2014/0277102 | A1 | 9/2014 | Mansur, Jr. et al. | |
| 2015/0297442 | A1 | 10/2015 | Bauer | |
| 2016/0242984 | A1* | 8/2016 | Takagi | A61H 1/006 |
| 2017/0087001 | A1 | 3/2017 | Fullerton | |
| 2018/0092797 | A1 | 4/2018 | Uzzo et al. | |
| 2018/0098707 | A1* | 4/2018 | Salamon | A61B 5/02416 |
| 2018/0177677 | A1 | 6/2018 | Pamplin et al. | |
| 2018/0303698 | A1* | 10/2018 | Wijesundara | F15B 15/10 |
| 2018/0338692 | A1 | 11/2018 | Robinson et al. | |
| 2019/0290479 | A1 | 9/2019 | Parish et al. | |
| 2019/0374424 | A1 | 12/2019 | Zeutzius et al. | |
| 2020/0113773 | A1* | 4/2020 | Ramanan | A61H 9/0092 |
| 2020/0205707 | A1* | 7/2020 | Sanyal | A61B 5/0816 |

FOREIGN PATENT DOCUMENTS

| | | | |
|---|---|---|---|
| CN | 106166106 | B | 12/2018 |
| CN | 209059559 | U | 7/2019 |
| EP | 1884226 | A1 | 2/2008 |
| EP | 1972312 | A2 | 9/2008 |
| EP | 3412262 | A1 | 12/2018 |
| JP | 1094574 | A | 4/1998 |
| WO | 0219954 | A2 | 3/2002 |
| WO | 2006033114 | A2 | 3/2006 |
| WO | 2007079777 | A1 | 7/2007 |
| WO | 2012009669 | A1 | 1/2012 |
| WO | 2015148223 | A1 | 10/2015 |
| WO | 2017117305 | A1 | 7/2017 |
| WO | 2017121434 | A1 | 7/2017 |
| WO | 2018152159 | A1 | 8/2018 |
| WO | 2019084448 | A1 | 5/2019 |
| WO | 2019182189 | A1 | 9/2019 |

* cited by examiner

WEARABLE HEALTH MANAGEMENT SYSTEM

CROSS-REFERENCE TO RELATED APPLICATION

This application claims priority to and the benefit under 35 U.S.C. § 119(e) of U.S. Provisional Application No. 63/037,140, filed on Jun. 10, 2020, entitled "WEARABLE HEALTH MANAGEMENT SYSTEM," the disclosure of which is hereby incorporated herein by reference in its entirety.

FIELD OF THE DISCLOSURE

The present disclosure generally relates to a health management system, and more particularly, a wearable health management system for treating various conditions, including lymphedema and deep vein thrombosis.

SUMMARY OF THE DISCLOSURE

According to one aspect of the present disclosure, a wearable health management system includes a flexible member configured to be worn on an affected area by a patient. At least one actuator is operably coupled to the flexible member. The at least one actuator is configured to be adjusted between a deployed state and a non-deployed state. At least one of a photoplethysmogram sensor and a bio-impedance sensor is coupled to the flexible member to obtain one or more health metrics from the patient. A controller is in communication with the at least one actuator. The controller is configured to adjust the at least one actuator to the deployed state to provide a selected pressure to the affected area.

According to another aspect of the present disclosure, a cuff for a patient includes a wearable flexible member. A rigid outer shell is disposed on an outer surface of the wearable flexible member. A plurality of actuators is operably coupled to at least one of the wearable flexible member and the rigid outer shell. Each actuator is adjustable between a deployed state and a non-deployed state. A connection feature is coupled to the rigid outer shell. The connection feature is configured to retain the cuff in a selected position on an affected area. A controller is configured to adjust each actuator between the deployed state and the non-deployed state. The controller is configured to sequentially adjust the plurality of actuators to the deployed state to provide pressure in a directional pattern.

According to another aspect of the present disclosure, a garment for providing treatment includes a first layer and a second layer coupled to the first layer. The first layer and the second layer are configured to be worn over an affected area. An actuator is disposed between the first layer and the second layer. The actuator is operable between a deployed state and a non-deployed state. A controller is communicatively coupled to the actuator and configured to adjust the actuator between the deployed state and the non-deployed state.

These and other features, advantages, and objects of the present disclosure will be further understood and appreciated by those skilled in the art by reference to the following specification, claims, and appended drawings.

DETAILED DESCRIPTION

Figure 1:
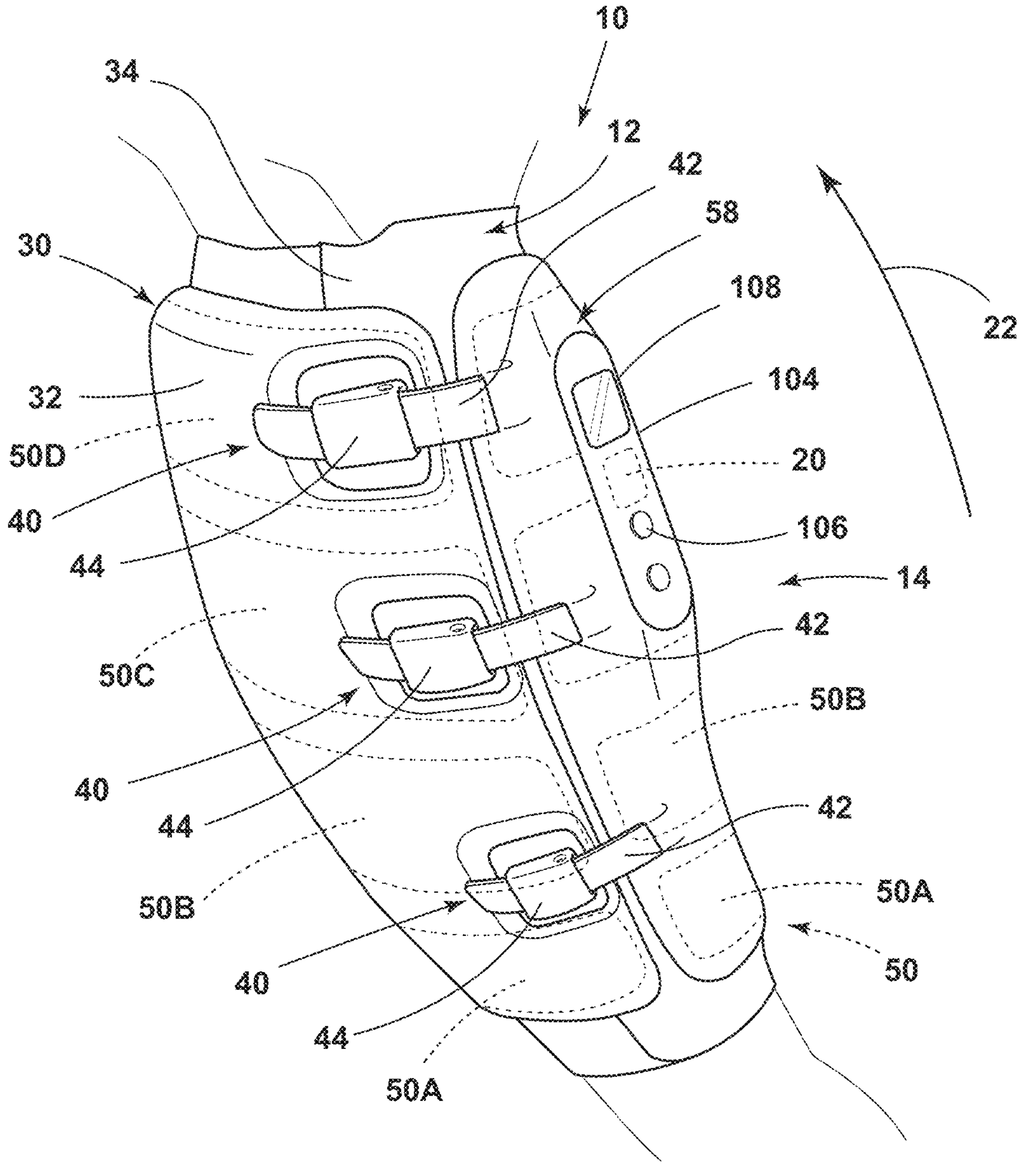
FIG. 1 is a side perspective view of a cuff with an outer shell worn on an arm of a patient, according to the present disclosure.

The present illustrated embodiments reside primarily in combinations of method steps and apparatus components related to a wearable health management system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front"

shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-16, reference numeral 10 generally designates a wearable health management system that includes a flexible member 12 configured to be worn on an affected area by a patient. At least one actuator 14 is operably coupled to the flexible member 12. The actuator 14 is configured to be adjusted between a deployed state and a non-deployed state. At least one of a photoplethysmogram (PPG) sensor 16 and a bioimpedance (BI) sensor 18 is coupled to the flexible member 12 to obtain one or more health metrics from the patient. A controller 20 is in communication with the actuator 14. The controller 20 is configured to adjust the actuator 14 to the deployed state to provide a directional pattern 22 of pressure to the affected area.

The health management system 10 may be used to manage certain health conditions, such as lymphedema or deep vein thrombosis (DVT). Lymphedema is a chronic disease that can result from a variety of factors, including diabetes, radiation, chemotherapy, and surgery. Lymphedema generally causes the body to fill with lymphatic fluid, which results in swelling. The swelling may cause pain and discomfort, as well as cause lesions and hardening of the skin. One method to help manage lymphedema includes massage therapy. Massage therapy may assist in moving lymphatic fluid to the lymphatic system and ultimately to the cardiovascular system. DVT is a condition where blood clots in parts of the body. DVT often affects people who are sedentary or aged. Massage therapy can assist in increasing blood flow in affected areas to manage DVT. Massage therapy may be provided by the health management system 10 disclosed herein.

Referring to FIG. 1, the health management system 10 may include a cuff 30. The cuff 30 generally includes the flexible member 12 and a rigid outer shell 32. The flexible member 12 is generally a garment that is worn by the patient over the affected area, such as the illustrated sleeve 34. The rigid outer shell 32 is disposed on an outer surface of the sleeve 34. Generally, the sleeve 34 extends beyond outer edges of the rigid outer shell 32 to increase comfort for the wearer. The rigid outer shell 32 may be configured as a clamshell with a hinge or living hinge to be placed around the affected area. As illustrated in FIG. 1, the rigid outer shell 32 is configured to be placed around the arm of the patient, however, depending on the affected area, the rigid outer shell 32 may have a variety of configurations. The rigid outer shell 32 may extend around the affected area of the patient in a substantially continuous manner.

The rigid outer shell 32 includes connection features 40 to retain the rigid outer shell 32 in the intended position over the affected area. In the configuration illustrated in FIG. 1, the connection features 40 are configured as straps 42 with a corresponding number of buckles 44. The straps 42 extend from a first edge of the rigid outer shell 32 and the buckles 44 may be disposed on a second edge. The first and second edges are separated by a gap that is configured to expand to allow the patient to move the affected area (e.g., the arm of the patient) into the rigid outer shell 32. Each strap 42 is configured to selectively engage the corresponding buckle 44 to retain the cuff 30 on the affected area of the patient. The straps 42 may be zip straps, locking cam straps, Velcro® straps, hook-and-loop fasteners, ties, or any other quick release features. The selective engagement between the straps 42 and the buckles 44 may be advantageous for providing quicker and more convenient application and removal of the cuff 30. It is contemplated that the straps 42 can be flexible or elastic and can stretch or bend based on the position of the patient to provide increased comfort for the patient and the affected area.

Referring still to FIG. 1, the cuff 30 includes the actuators 14. The actuators 14 may be configured as bladders 50A-50D, which are collectively referred to herein as bladders 50. The bladders 50 may be coupled to an inner surface of the rigid outer shell 32. The bladders 50 may be disposed adjacent to or abutting the skin of the patient when the rigid outer shell 32 is worn. The bladders 50 may alternatively abut the sleeve 34 when the sleeve 34 is worn with the rigid outer shell 32. Each bladder 50 is adjustable between the deployed state and the non-deployed state. The deployed state may be an inflated state of each bladder 50, and the non-deployed state may be a deflated state of each bladder 50. The deployed state may be advantageous for providing pressure on the affected area of the patient. The bladders 50 may be adjusted using any fluid, including, for example, liquids, gels, or gasses. The fluid is directed into the bladders 50 to adjust the bladders 50 to the deployed state and removed from the bladders 50 to adjust the bladders 50 to the non-deployed state.

The wearable health management system 10 includes a control assembly 58 for controlling the pressure applied to the affected area. In the illustrated example of FIG. 1, the control assembly 58 is integrated into the rigid outer shell 32; however, the control assembly 58 may otherwise be coupled to the rigid outer shell 32. The control assembly 58 includes the controller 20, a pump 60, and a power source 62. In various aspects, the control assembly 58 may include storage for housing fluid when some or all of the bladders 50 are in the non-deployed state. Each bladder 50 is in fluid communication with the pump 60 via a manifold, tubing, or other fluid passages.

The controller 20 is configured to activate the pump 60 to direct fluid and, consequently, adjust the bladders 50 to apply the selected pressure to the affected area. Each bladder 50 may be adjusted independently to produce the directional pattern 22 of pressure on the affected area. For example, the bladder 50A, disposed adjacent to the wrist of the wearer, may be adjusted to the deployed state first to apply pressure to the skin of the wearer adjacent to the wrist. The pressure generally forces fluid away from the wrist, toward the shoulder of the wearer. The bladder 50B, disposed adjacent to the bladder 50A, may be adjusted to the deployed state second. The pressure may be applied to a greater surface area of the affected area and push the fluid further away from the wrist. Next, the bladder 50C may be adjusted to the deployed state to apply pressure and push fluid further away from the wrist. As the bladder 50C is adjusted to the deployed state, the bladder 50A may be adjusted to the non-deployed state, thereby removing pressure from the affected area adjacent to the wrist. The bladder 50B may remain in the deployed state to prevent fluid from moving back toward the wrist in response to the pressure applied by the bladder 50C.

The bladder 50D, disposed adjacent to an elbow or shoulder of the wearer depending on the configuration of the cuff 30, may be adjusted next to the deployed state to apply pressure to the affected area and further push the fluid out of the arm and to the trunk or central cavity of the body. As the bladder 50D is adjusted to the deployed state, the bladder 50B may be adjusted to the non-deployed state while the bladder 50C remains in the deployed state. This configuration may prevent fluid from returning to the limb in response to the pressure from the bladder 50D. After the bladder 50D has remained in the deployed state for a predetermined amount of time, the bladder 50C may be adjusted to the non-deployed state and the bladder 50D may also then be adjusted to the non-deployed state.

It is contemplated that each of the bladders 50A-50C may remain in the deployed state until the bladder 50D has been in the deployed state for a predetermined amount of time. All the bladders 50A-50D may then be adjusted to the non-deployed state simultaneously. Additionally or alternatively, the bladder 50A may be re-adjusted to the deployed state substantially simultaneously with the bladder 50D to begin the directional pattern 22 of pressure again, which may provide a continuous wave-like pattern of pressure moving away from the wrist. Accordingly, the bladders 50 may be sequentially adjusted to the deployed state to direct lymphatic fluid or promote blood flow out of the limb and to the trunk of the body.

Figure 2:
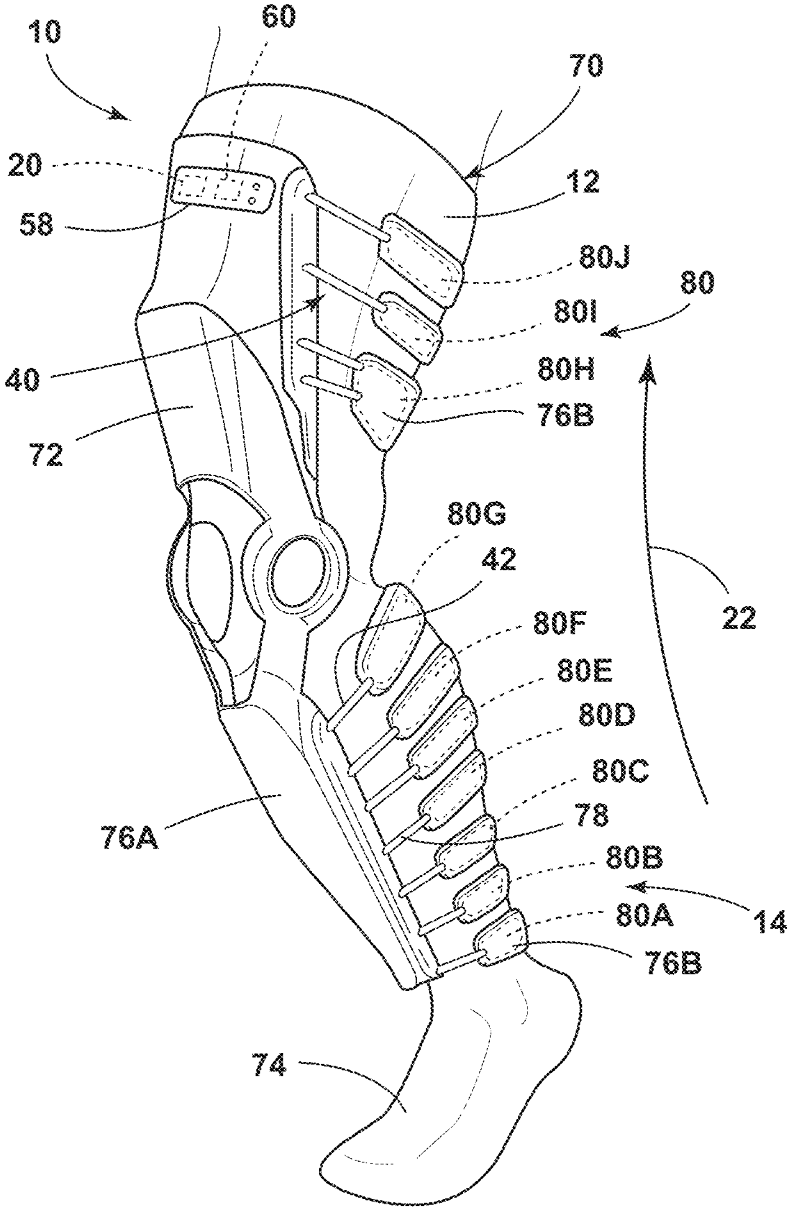
FIG. 2 is a schematic view of a cuff with an outer shell worn on a leg of a patient, according to the present disclosure.

Referring to FIG. 2, an additional or alternative configuration of a cuff 70 is illustrated, which is worn on a leg of the patient. A rigid outer shell 72 is disposed on an outer surface of the flexible member 12, which is illustrated as a sock 74. Generally, the sock 74 extends higher on the leg than the rigid outer shell 72 and covers the foot to increase comfort of the patient. However, other configurations of the sock 74 are contemplated without departing from the teachings herein.

The rigid outer shell 72 may have a substantially continuous surface 76A above the knee and below the knee on the front side of the leg. The rigid outer shell 72 may have elongate supports 76B that extend around the back of the leg. The elongate supports 76B may be spaced-apart from one another, which can provide increased comfort for the patient depending on the position of the leg. The knee may be free of the rigid outer shell 72 and the elongate supports 76B to provide increase comfort and allow the wearer to move or bend the leg while wearing the cuff 70. This configuration of the rigid outer shell 72 may be advantageous for providing flexibility to the wearer during treatment.

The elongate supports 76B of the rigid outer shell 72 are coupled with the continuous front surface 76A of the rigid outer shell 72 through the connection features 40, which are configured as bands 78 in the example illustrated in FIG. 2. The bands 78 may be coupled to a single end of each elongate support 76B, such that the other end of each elongate support 76B is integrally formed with the continuous surface 76A of the rigid outer shell 72. Alternatively, both ends of each elongate support 76B may be coupled to the continuous surface 76A of the rigid outer shell 72 via the bands 78. The bands 78 may be elastically and resiliently deformable to allow the wearer to slide the leg into and out of the rigid outer shell 72. The bands 78 are generally configured to expand and contract to mold the rigid outer shell 72 to the affected area. It is contemplated that the bands 78 may be fixedly coupled to the rigid outer shell 72 on both ends, or alternatively, may have on end fixedly coupled to the rigid outer shell 72 with the opposing end configured to disconnect to assist in applying and removing the cuff 70 to the leg.

Referring still to FIG. 2, the cuff 70 includes the actuators 14 to apply pressure to the leg. The actuators 14 of FIG. 2 are configured as bladders 80A-80J, which are collectively referred to herein as bladders 80. The bladders 80 may be disposed in one or both of the continuous surface 76A of the rigid outer shell 72 on the front side of the leg and the elongate supports 76 on the back side on the leg. The bladders 80 are adjustable between the deployed state to apply pressure to the affected area and the non-deployed state. Similar to the example in FIG. 1, the deployed state may be an inflated condition of each bladder 80, and the non-deployed state may be a deflated condition of each bladder 80. Moreover, each bladder 80 is in fluid communication with the pump 60 via a manifold, tubing, or other fluid passages.

The bladders 80 are generally adjusted sequentially to apply pressure to the leg that pushes fluid out of the limb and to the trunk or central cavity of the body. Each bladder 80 (e.g., bladder 80A, etc.) may be a single bladder 80 extending around the leg, or alternatively, may be one or more bladders 80 that together extend around the circumference of the leg. The bladder 80A, disposed adjacent to the ankle, may be adjusted to the deployed state first. The pressure is configured to push fluid away from the ankle and up the leg. The bladder 80B, disposed adjacent to the bladder 80A, may then be adjusted to the deployed state. The bladder 80A may remain in the deployed state to prevent fluid from moving back toward the ankle in response to the pressure applied by the bladder 80B. In a similar sequential manner, each of the bladders 80C-80J may be adjusted to the deployed state to apply pressure in a pattern from the ankle to the thigh, thereby driving the fluid away from the ankle, out of the leg, and to the trunk of the body. The bladders 80 may be adjusted to the non-deployed state in a similar manner as previously described in reference to the example of FIG. 1.

The directional pattern 22 of pressure produced by the sequential adjustment applied by the cuff 70 is advantageous for moving lymphatic fluid or promoting blood flow away from the affected area to be processed. The directional pattern 22 of pressure may result in a directional activation of lymphatic vessels to assist in processing the buildup of fluid in the body. The bladders 80 may apply pressure from a distal portion of the body (e.g., the ankle) to a proximal portion of the body (e.g., the hip), thereby activating the lymphatic vessels to transport the fluid from the limb toward the trunk of the body. The directional pattern 22 drives the fluid into the center core of the body to be processed by the circulatory system. The pressure applied by the bladders 80 as part of the health management system 10 may also assist in lymph node activation to assist in processing the lymphatic fluid. The health management system 10 may be advantageous for massaging lymph vessels and activating lymph nodes to process the buildup of fluid in the affected area.

Figure 3:
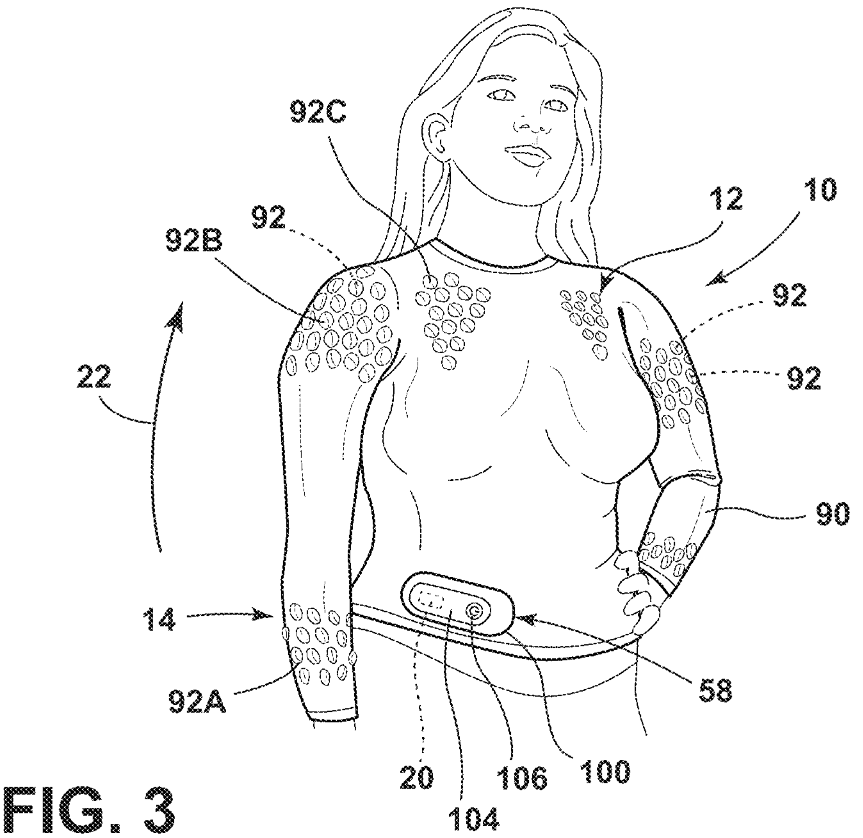
FIG. 3 is a schematic view of a wearable flexible member having a plurality of chambers, according to the present disclosure.
Figure 4:
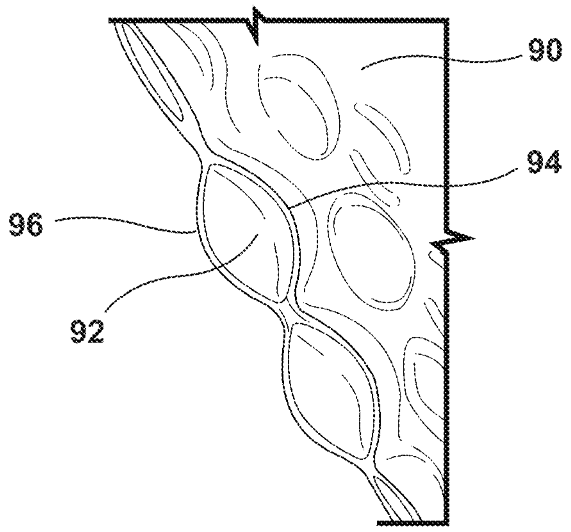
FIG. 4 is a cross-sectional perspective view of the plurality of chambers of FIG. 3, shown in a deployed state.

Referring to FIGS. 3 and 4, an additional or alternative example of the wearable health management system 10 is illustrated, which includes the flexible member 12 configured as a shirt 90 that includes the actuators 14. The actuators 14 are configured as chambers 92 defined in the shirt 90. The illustrated shirt 90 extends over the torso and both arms; however, it is contemplated that the shirt 90 may have other configurations, for example, extending over the torso and not the arms or a single arm, etc. The chambers 92 are generally arranged in a honeycomb pattern across the shirt 90; however, other configurations of the chambers 92 are contemplated without departing from the teachings herein. The shirt 90 is generally form-fitted to contact the skin of the patient to provide massage therapy.

The shirt 90 is generally constructed of a first layer 94 of fabric or material and a second layer 96 of fabric or material. The chambers 92 are defined in various locations between the first layer 94 and the second layer 96. The chambers 92 can have a variety of configurations based on the affected area of the patient. As illustrated, each chamber 92 has a substantially circular or oblong shape.

Referring still to FIGS. 3 and 4, the control assembly 58 may be coupled to, or integrated into, the shirt 90. The control assembly 58 includes a housing 100 coupled to the outer surface of the shirt 90. The housing 100 is generally removable from the shirt 90 to access components within the control assembly 58. The control assembly 58 includes the controller 20, the pump 60, and the power source 62. The pump 60 is in fluid communication with each chamber 92 via a manifold, tubing, or other fluid passages that may extend between the layers 94, 96 of the shirt 90.

Each chamber 92 is adjustable between the deployed state and the non-deployed state. Each chamber 92 may be selectively and independently adjusted relative to the remaining chambers 92, or alternatively, the chambers 92 may be adjusted in groups. The deployed state may be an inflated condition of each chamber 92, and the non-deployed state may be a deflated condition of each chamber 92. When in the non-deployed state, the chambers 92 may be configured to blend with the remainder of the shirt 90.

As illustrated in FIG. 3, the chambers 92 are arranged in three chamber groups 92A-92C, collectively referred to herein as the chambers 92, on each of the right and left sides of the body. The first chamber group 92A is disposed adjacent to the wrist, the second chamber group 92B is disposed adjacent to the shoulders, and the third chamber group 92C is disposed adjacent to the chest. Additional chamber groups may be included in the shirt 90 without departing from the teachings herein. The groups of chambers 92 on the right side of the wearer may be adjusted simultaneously with or independently of the corresponding chamber groups on the left side of the wearer.

The first chamber group 92A may be adjusted to the deployed state first, to apply pressure to the skin of the wearer on the affected area and begin to push fluid away from the wrist. The second chamber group 92B may be adjusted to the deployed state second, while the first chamber group 92A remains in the deployed state to prevent fluid from returning to the limb. Subsequently, the third chamber group 92C may be adjusted to the deployed state to drive fluid across or down the chest, pushing the fluid toward the trunk of the body. As the third chamber group 92C is adjusted to the deployed state, the first chamber group 92A may be adjusted to the non-deployed state and thereby remove pressure from the affected area adjacent to the wrist. Accordingly, the chamber groups 92A-92C may be sequentially adjusted to the deployed state to provide the directional pattern 22 of pressure. Each chamber 92 in each chamber group 92A-92C may be adjusted simultaneously, or alternatively may be adjusted in a distal to proximal pattern.

Referring to FIGS. 1-3, the controller 20 is configured to adjust each actuator 14 between the deployed state and the non-deployed state. To adjust the actuators 14 to the deployed state, the controller 20 may activate the pump 60, which directs fluid into the selected actuator 14. The fluid may be air, liquid, gel, or any other fluid. To adjust each actuator 14 to the non-deployed state, the controller 20 may send a signal to the pump 60, which may remove fluid from the actuators 14 (e.g., a vacuuming effect). The control assembly 58 may include storage space for housing the additional fluid. Alternatively, the fluid communication between the pump 60 and the actuators 14 may be disrupted to allow the fluid to release from the actuators 14. In such examples, the garment may be permeable to allow the fluid to release from the health management system 10.

Each actuator 14 is independently controlled by the controller 20. The controller 20 is configured to adjust the selected actuator 14 to the deployed state to apply a selected pressure to the affected area of the patient. The amount of fluid directed to the selected actuator 14 may vary the pressure on the affected area. The controller 20 may sequentially adjust the actuators 14 in the directional pattern 22 to assist in moving lymphatic fluid or promoting blood flow in a selected direction. The directional pattern 22 of pressure is generally directed toward the central cavity to push the lymphatic fluid toward lymph nodes, such that the lymphatic fluid can be processed by the lymphatic system. Moreover, the directional pattern 22 directs fluid and blood away from the affected area.

The control assembly 58 includes a user-interface 104 for receiving user commands regarding the operation of the wearable health management system 10. The user-interface 104 may include buttons 106 or other selectable touch elements to receive an input to control the pressure applied to the affected area. The user-interface 104 may include a display 108, which may indicate a variety of information including massage therapy protocols, various status updates, or other useful information for the patient. The wearer may control the amount of pressure, the massage therapy protocol, the timing, etc. of the treatment applied by the wearable health management system 10 via the user-interface 104.

Figure 5:
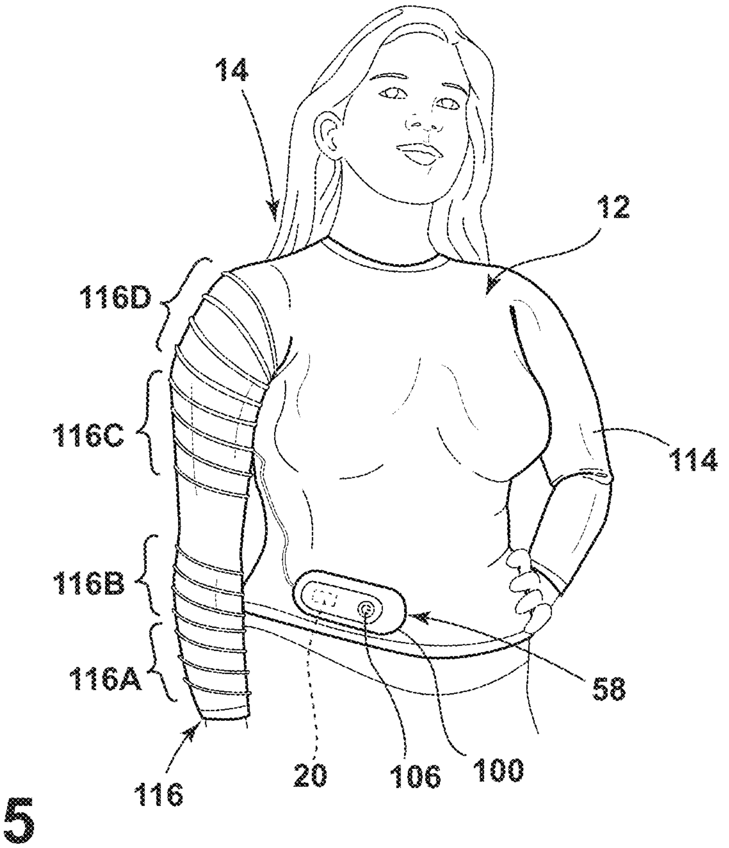
FIG. 5 is a schematic view of a flexible member having a plurality of cables, according to the present disclosure.

Referring to FIG. 5, an additional or alternative configuration of the health management system 10 is illustrated, which includes the flexible member 12 configured as a shirt 114 and the actuators 14 configured as cables 116. The cables 116 may be disposed around the shirt 114 in any practicable location. In the illustrated example, each cable 116 forms a band circling the arm, with the cables 116 arranged along the forearm and the upper arm of the wearer. The cables 116 are generally disposed between a first layer of fabric and a second layer of fabric that form the shirt 114. However, the cables 116 may be disposed on an inner surface of the shirt 114 and directly abut the skin of the wearer or on an outer surface of the shirt 114.

Each cable 116 is adjustable between the deployed state and the non-deployed state. The deployed state may be a contracted condition of each cable 116, and the non-deployed state may be a relaxed condition of each cable 116. When in the non-deployed state, the cables 116 may blend with the remainder of the shirt 114 so as to be generally obscured from view. Each cable 116 is in communication with the controller 20. The controller 20 is configured to send a signal to adjust the cable 116 to the deployed state. When deployed, each cable 116 may contract around the arm to apply pressure. Each cable 116 may be adjusted in response to a voltage, a current, or other electrical attributes.

The cables 116 may provide the directional pattern 22 of pressure through sequential activation to the deployed position. Cable groups 116A-116D, collectively referred to as the cables 116, are arranged along the arm of the wearer. Each cable group 116A-116D may include any practicable number of cables 116, and the shirt 114 may include any practicable number of groups. In the illustrated example, the cable groups 116A, 116B are arranged along the forearm of the wearer, and the cable groups 116C, 116D are arranged along the upper arm of the wearer. The cable group 116A adjacent to the wrist may be adjusted to the deployed state first, to begin to drive fluid away from the wrist.

The cable group 116B may be adjusted to the deployed state next, and then subsequently the cable group 116C. As the cable group 116C is adjusted to the deployed state, the cable group 116A may be adjusted to the non-deployed state to remove pressure from adjacent to the wrist. The cable group 116B may remain in the deployed state to prevent fluid from moving toward the wrist in response to the pressure applied by the cable group 116C. The remaining cable group 116D may be adjusted between the deployed state and the non-deployed state in a similar sequential manner. In this way, the pressure is provided to the arm in a sequence or wave from proximate the wrist to proximate the shoulder to drive the fluid away from the wrist, out of the limb, and to the trunk of the wearer. It is contemplated that the cables 116 may also be arranged along the other arm or the torso of the wearer. Each cable 116 in each cable group 116A-116D may be adjusted simultaneously, or alternatively may be adjusted in a distal to proximal pattern.

Figure 6:
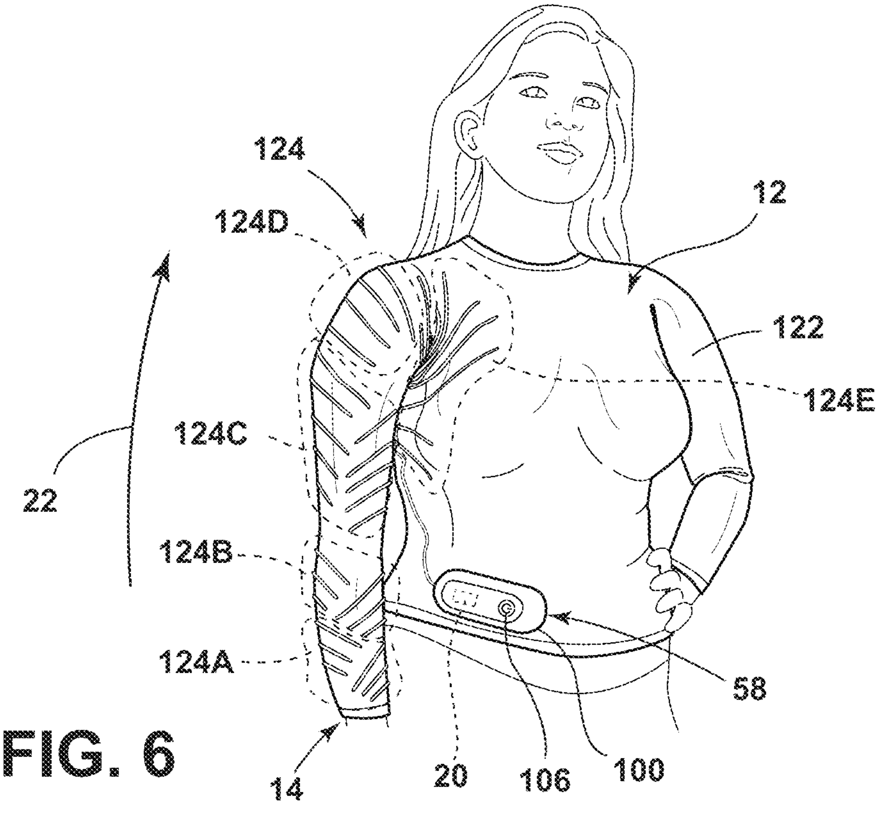
FIG. 6 is a schematic view of a wearable flexible member having a plurality of actuators, according to the present disclosure.

Referring to FIG. 6, an additional or alternative configuration of the wearable health management system 10 is illustrated, with the flexible member 12 configured as a shirt 122 and the actuators 14 configured as supercoiled polymer (SCP) assemblies 124. The SCP assemblies 124 are arranged in SCP groups 124A-124E, referred to herein collectively as the SCP assemblies 124. The SCP assembly 124 may include at least one or several SCPs 126 arranged along the shirt 122. As illustrated, the SCPs 126 are arranged along the right arm of the wearer, but may also be arranged along the left arm or the torso without departing from the teachings herein.

The SCPs 126 are adjustable between the deployed state and the non-deployed state. The deployed state is generally a contracted condition of the SCPs 126 that applies pressure to the affected area of the wearer. The non-deployed state is generally a relaxed condition of the SCPs 126, such that additional pressure may not be applied to the affected area. When in the non-deployed state, the SCPs 126 may blend with the remainder of the shirt 122 so as to be generally obscured from view. Each SCP 126 substantially circles the arm and is arranged at an angle to provide different angles for pressure to be applied.

The SCP assemblies 124 are arranged in the SCP groups 124A-124E across the shirt 122. The SCP group 124A is disposed adjacent to the wrist and the SCP group 124B is disposed on the forearm adjacent to the elbow. The SCP group 124C is disposed adjacent to the elbow on the upper arm, and the SCP group 124D is disposed on the upper arm adjacent to the shoulder. Each of the SCP groups 124A-124D is arranged on an outer side of the arm and an inner side of the arm. The SCP group 124E is disposed on the torso.

Similar to the other configurations described herein, the SCP assemblies 124 are sequentially activated to produce the directional pattern 22 of pressure on the arm to drive fluid out of the limb and to the trunk of the body. The SCP group 124A is adjusted to the deployed state first, applying pressure and driving fluid away from the wrist. The SCP group 124B is subsequently adjusted to the deployed state, driving the fluid out of the forearm. The SCP group 124C is then adjusted to the deployed state, while the SCP group 124A is adjusted to the non-deployed state. The SCP group 124D is then adjusted to the deployed state followed by the SCP group 124E on the torso. The SCP groups 124A-124E are sequentially activated and apply pressure to the arm to drive the fluid away from the wrist, out of the arm, and toward the center of the torso. Each SCP assembly 124 in each SCP group 124A-124E may be adjusted simultaneously, or alternatively may be adjusted in a pattern from distal to the trunk of the body to proximate the trunk of the body.

Figure 7:
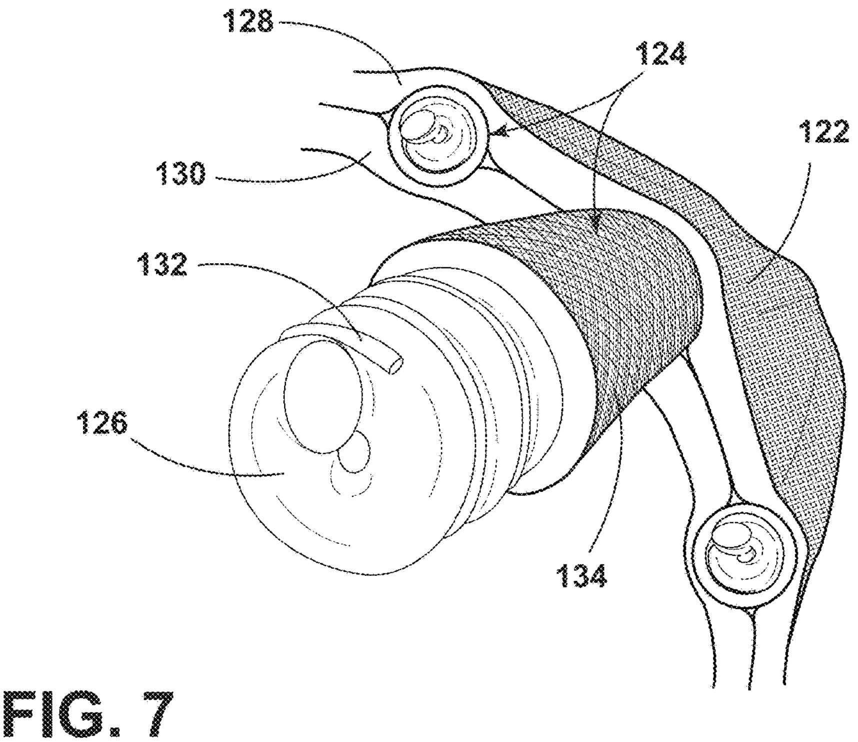
FIG. 7 is an enlarged view of the plurality of actuators of FIG. 6, where the actuators are configured as supercoiled polymers, according to the present disclosure.

Referring to FIGS. 6 and 7, as previously noted, each SCP assembly 124 includes at least one SCP 126. Each SCP 126 generally extends between a first layer 128 of fabric or material and a second layer 130 of fabric or material that form the shirt 122. This configuration may be advantageous for substantially obscuring the SCPs 126 from view when the SCPs 126 are in the non-deployed state. Moreover, the SCPs 126 extending between the layers 128, 130 of fabric may enhance the effect of the contraction of the SCPs 126 in affecting pressure on the affected area. It is also contemplated that the SCPs 126 may be coupled to an inner surface of the shirt 122 or woven into the fabric of the shirt 122.

As illustrated in FIG. 7, the SCPs 126 are spaced apart from one another at even intervals to provide massage therapy to push lymphatic fluid in the selected direction. The SCPs 126 are wound into a helical coil, spring shape. To form the coiled shape, the SCPs 126 are over-wound until the SCPs 126 bend in on themselves. The SCPs 126 are heat-treated to fix the alignment in the helical coil.

The SCP assemblies 124 generally include the SCP 126, a conductive member 132, and a heat resistant feature 134. The conductive member 132 has a corresponding helical shape and is coiled with each SCP 126. Each conductive member 132 conducts heat to the respective SCP 126, which causes the SCP 126 to contract around the arm to the deployed state. When heat is applied to the SCP 126, the SCP 126 contracts, and consequently, the SCP 126 may pull on components attached thereto. For example, the SCP 126 may be coupled to the shirt 122 on each end, such that the contraction of the SCP 126 can pull the shirt 122 to apply pressure to the affected area of the patient.

Each combination of SCP 126 and corresponding conductive member 132 may be surrounded by the heat resistant feature 134. The heat resistant feature 134 is generally configured as a flexible tube that prevents heat from being transferred to the shirt 122, and subsequently to the patient. It is contemplated that the actuator 14 may be constructed as a sliding pad, configured to provide sliding pressure across the affected area in response to heat.

Figure 8A:
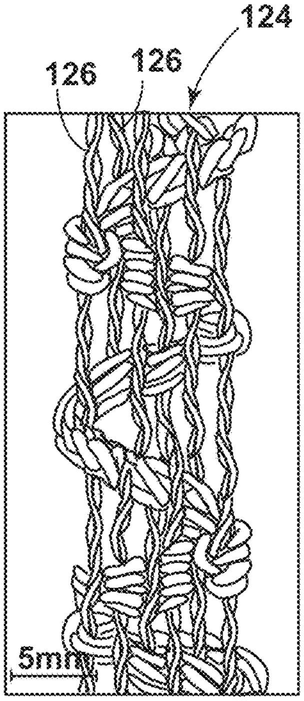
FIG. 8A is an enlarged view of a woven configuration of supercoiled polymers, according to the present disclosure.
Figure 8B:
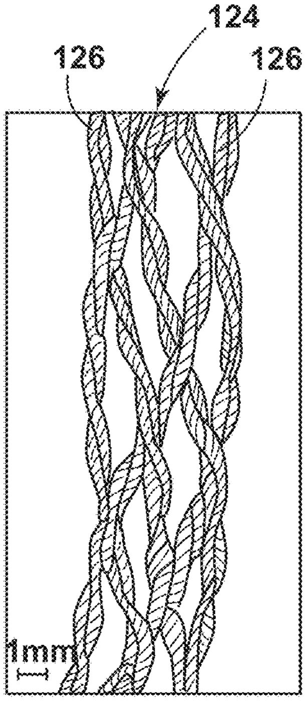
FIG. 8B is an enlarged view of a two-dimensional braided configuration of supercoiled polymers, according to the present disclosure.
Figure 8C:
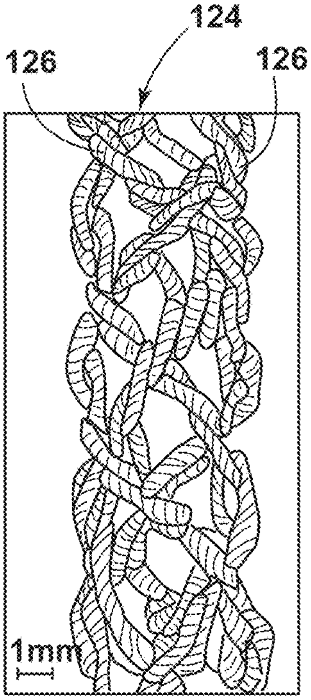
FIG. 8C is an enlarged view of a three-dimensional braided configuration of supercoiled polymers, according to the present disclosure.

Referring to FIGS. 7 and 8A-8C, the SCPs 126 may have a variety of configurations. As illustrated in FIG. 7, each SCP 126 is an independent strand spaced apart from adjacent SCPs 126. As illustrated in FIGS. 8A-8C, the SCPs 126 can be bundled to amplify the force of the SCPs 126. As illustrated in FIG. 8A, a plurality of SCPs 126 may be arranged parallel to one another with fabric woven between the SCPs 126. As illustrated in FIG. 8B, the SCPs 126 may be braided together in a two-dimensional braided bundle. As illustrated in FIG. 8C, the SCPs 126 may be braided together to form a three-dimensional braided bundle. The configuration of the SCPs 126 may depend on the patient, the health management system 10, the massage therapy protocol, the overall configuration of the shirt 122, or a combination thereof.

Referring to FIGS. 6-8C, the controller 20 is configured to send a signal for heat to be generated in the conductive member 132 associated with the SCPs 126 selected to be adjusted to the deployed state. The heat generally travels through the conductive member 132 to the SCP 126 causing the SCP 126 to contract to the deployed state and apply pressure to the affected area of the patient. The amount of pressure applied by the SCP 126 may vary based on the amount of heat, and consequently, the amount of contraction of the SCP 126. When the heat is removed, the SCP 126 generally expands to the non-deployed state, removing the pressure from the affected area.

Figure 9:
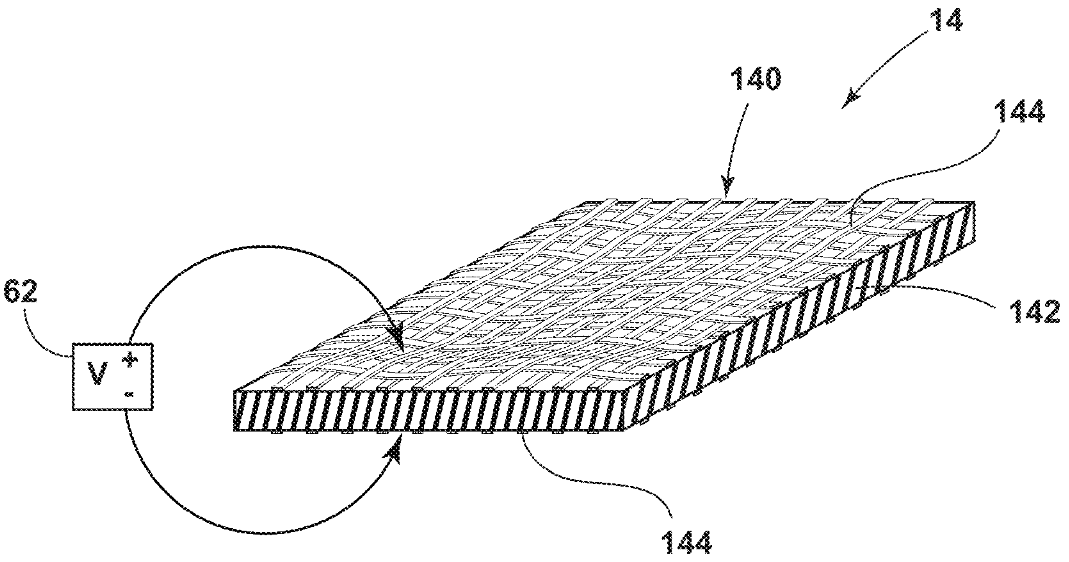
FIG. 9 is a schematic view of a substrate with conductive material applied to the substrate, according to the present disclosure.

Referring to FIGS. 9-12B, an additional or alternative configuration of the wearable health management system 10 is illustrated, with the actuators 14 configured as electro-activated actuation assemblies 140 that includes a dielectric polymer 142. The actuation assemblies 140 may be included in any configuration of the flexible member 12, as described herein, and may be arranged in any practicable configuration relative to the affected area. Generally, the dielectric polymer 142 is a rubber-like material, such as polyvinyl chloride (PVC), which is processed through a chemical treatment to soften the material, or a very high bond (VHB) rubber. A conductive layer 144 is applied to two opposing surfaces of the dielectric polymer 142, which is illustrated in FIG. 9 as the top or outer surface and the bottom or inner surface. When a voltage is applied, the electro-activated actuation assembly 140 operates as a capacitor with two conductors (e.g., the conductive layers 144) and the dielectric (e.g., the dielectric polymer 142) between the two conductors. It is contemplated that when the dielectric polymer 142 is included in the flexible member 12 and worn by the user, one surface (e.g., the bottom surface) of the dielectric polymer 142 will be oriented toward the skin of the user while the other surface (e.g., the top surface) will be oriented away from the skin of the user.

Figure 10:
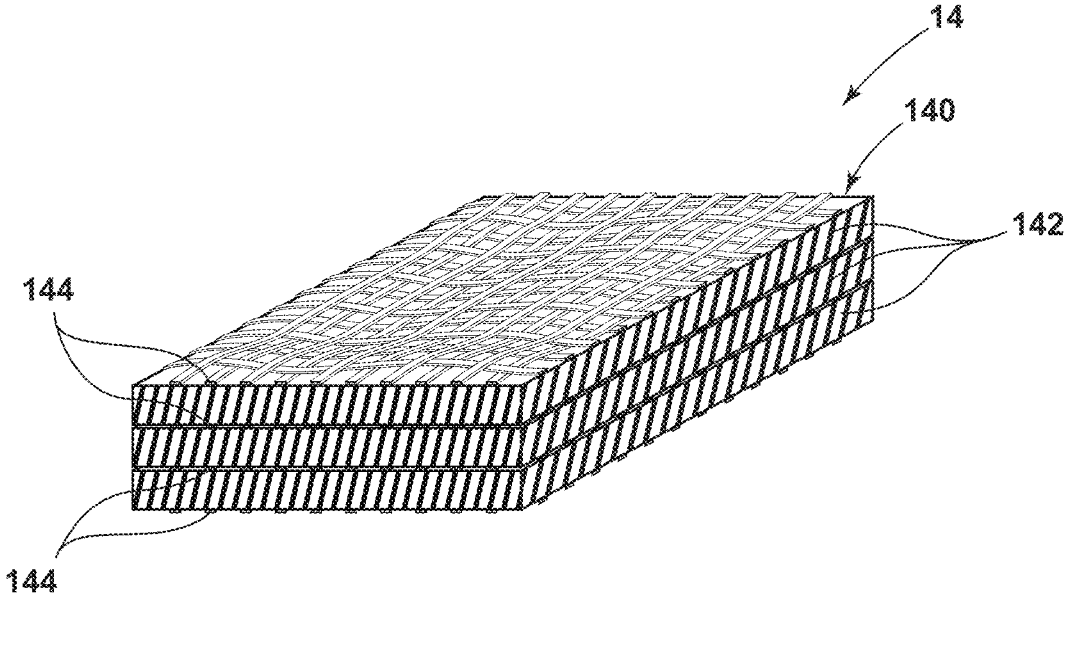
FIG. 10 is a schematic view of an actuator including a stacked configuration of the substrate and the conductive material of FIG. 9, according to the present disclosure.

Referring to FIG. 10, the electro-activated actuation assembly 140 generally includes multiple dielectric polymers 142 in a stacked configuration. The dielectric polymers 142 alternate with the conductive layers 144. A voltage is applied to the actuation assembly 140 to adjust the actuation assembly 140 between the deployed state and the non-deployed state. The deployed state may be a compressed condition of each actuation assembly 140, and the non-deployed state may be a relaxed or non-compressed condition of each actuation assembly 140.

Figure 11A:
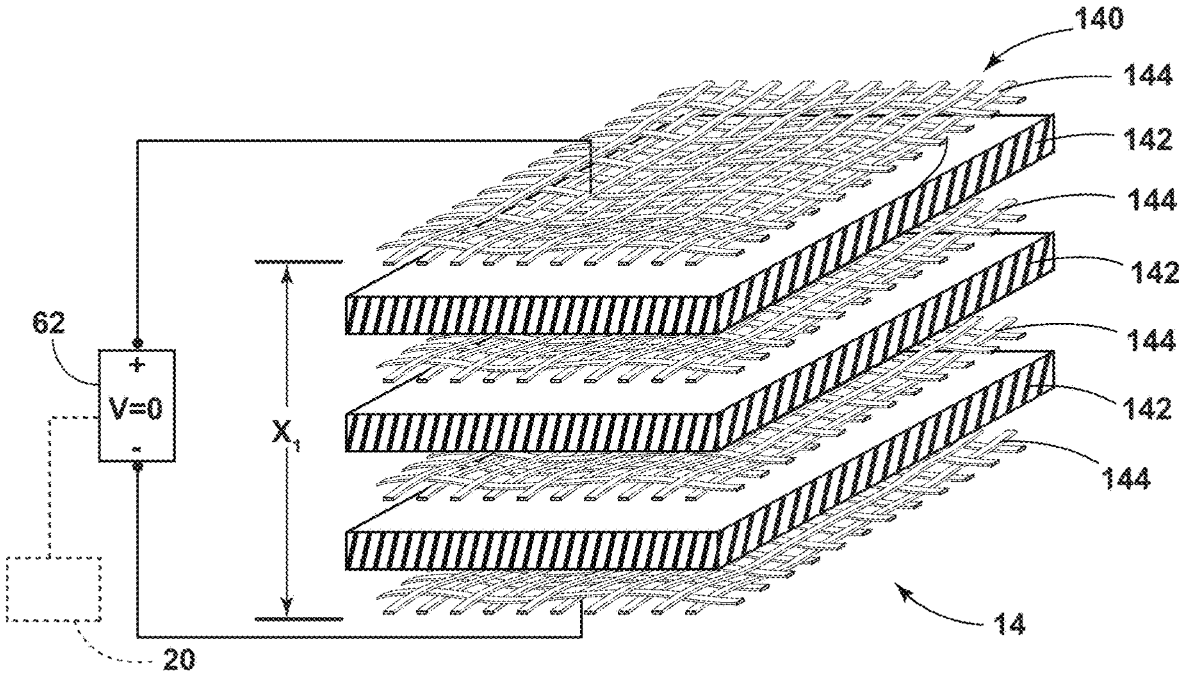
FIG. 11A is a schematic view of an actuator in a non-deployed state, according to the present disclosure.
Figure 11B:
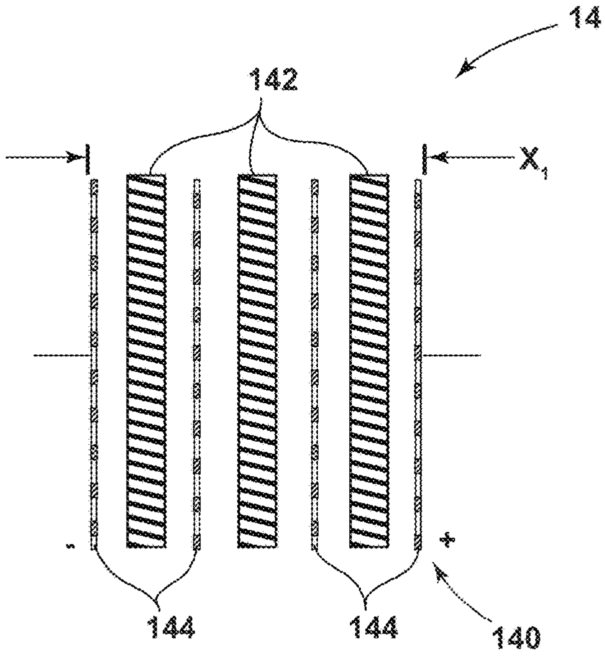
FIG. 11B is a schematic view of an actuator in a non-deployed state according, to the present disclosure.

Referring to FIGS. 11A and 11B, the electro-activated actuation assembly 140 is illustrated in the non-deployed state. In the non-deployed state, the electro-activated actuation assembly 140 is free of any applied voltage (V=0 kV). Moreover, when in the non-deployed state, the electro-activated actuation assembly 140 has a distance $x_1$ between the outermost conductive layers 144. The actuation assembly 140 may not apply additional pressure to the affected area of the patient when in the non-deployed state. Further, the actuation assembly 140 may blend with the surrounding garment (e.g., the flexible member 12).

Figure 12A:
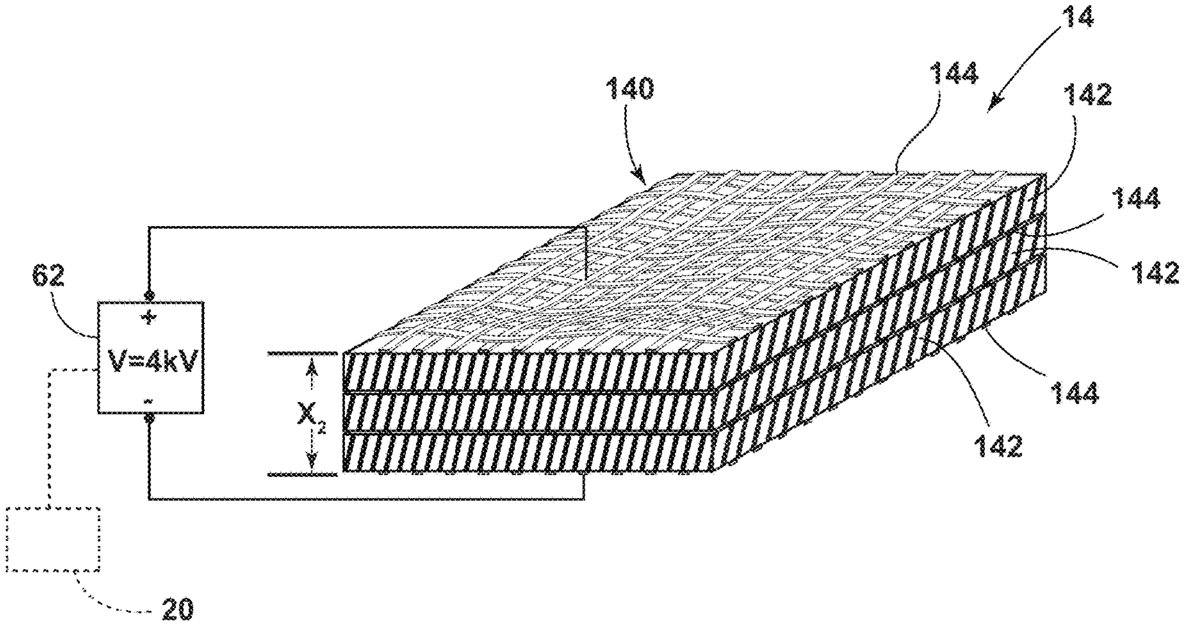
FIG. 12A is a schematic view of an actuator in a deployed state, according to the present disclosure.
Figure 12B:
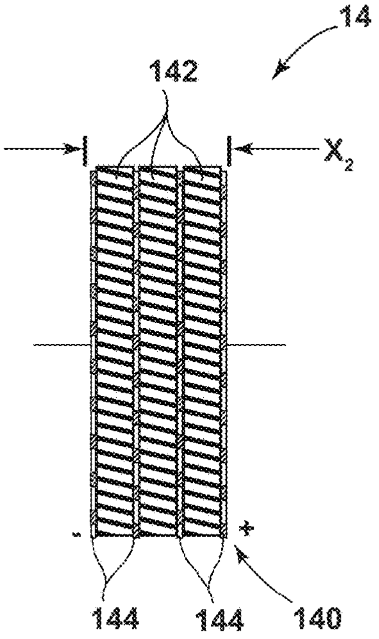
FIG. 12B is a schematic view of an actuator in a non-deployed state according, to the present disclosure.

Referring to FIGS. 12A and 12B, the actuation assembly 140 is illustrated in the deployed state, which is the compressed condition for applying pressure to the affected area. When the voltage is applied to the actuation assembly 140, the actuation assembly 140 compresses into the deployed state. In the illustrated example, a voltage of about 4 kV is applied to the actuation assembly 140; however, any practicable voltage can be applied to the actuation assembly 140 without departing from the teachings herein. When contracting to the deployed state, the actuation assembly 140 has a distance $x_2$ between the outermost conductive layers 144, where $x_2<x_1$.

Referring again to FIGS. 9-12B, the actuation assemblies 140 with the dielectric polymer 142 may be disposed in an array or matrix around the flexible member 12 and actuated in accordance with a massage therapy protocol. In a non-limiting example, the actuation assembly 140 may be disposed between the two layers of fabric of the flexible member 12. The stacked configuration of the actuation assembly 140 is disposed within the flexible member 12, such that the distances $x_1$ and $x_2$ extend outward from the skin of the patient. Accordingly, when the actuation assembly 140 adjusts to the deployed state, the actuator 14 compresses into the skin of the patient to apply pressure.

The controller 20 is in communication with each actuation assembly 140 to adjust each actuation assembly 140 between the deployed state and the non-deployed state. Generally, the actuation assembly 140 includes a cathode and an anode stacked around each dielectric polymer 142. A voltage source, such as the power source 62, may supply the voltage to the actuation assembly 140 via an electrical connection in response to a signal from the controller 20. When the voltage is applied to the actuation assembly 140, the actuation assembly 140 contracts to the deployed state and applies pressure to the patient. When the voltage is removed from the actuation assembly 140, the actuation assembly 140 may expand to the non-deployed state. Accordingly, the actuation assembly 140 may compress and expand to change the pressure on the affected area of the patient. The actuation assembly 140 may be configured as a capacitor adjusting between the deployed state and the non-deployed state in response to an electric field. The pressure may begin adjacent to the wrist or the ankle and continue along the limb toward the trunk of the body as the actuation assemblies 140 are sequentially activated. The amount of pressure applied to the affected area generally depends on the strength of the electric field applied to the actuation assembly 140.

Figure 13:
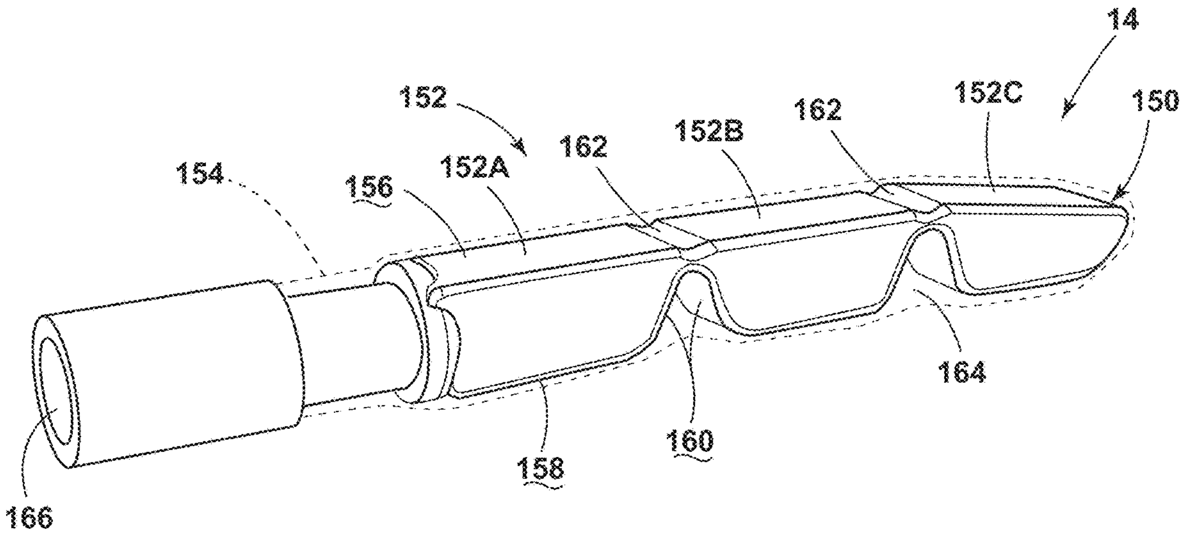
FIG. 13 is a side perspective view of an actuator in a non-deployed state, according to the present disclosure.
Figure 14:
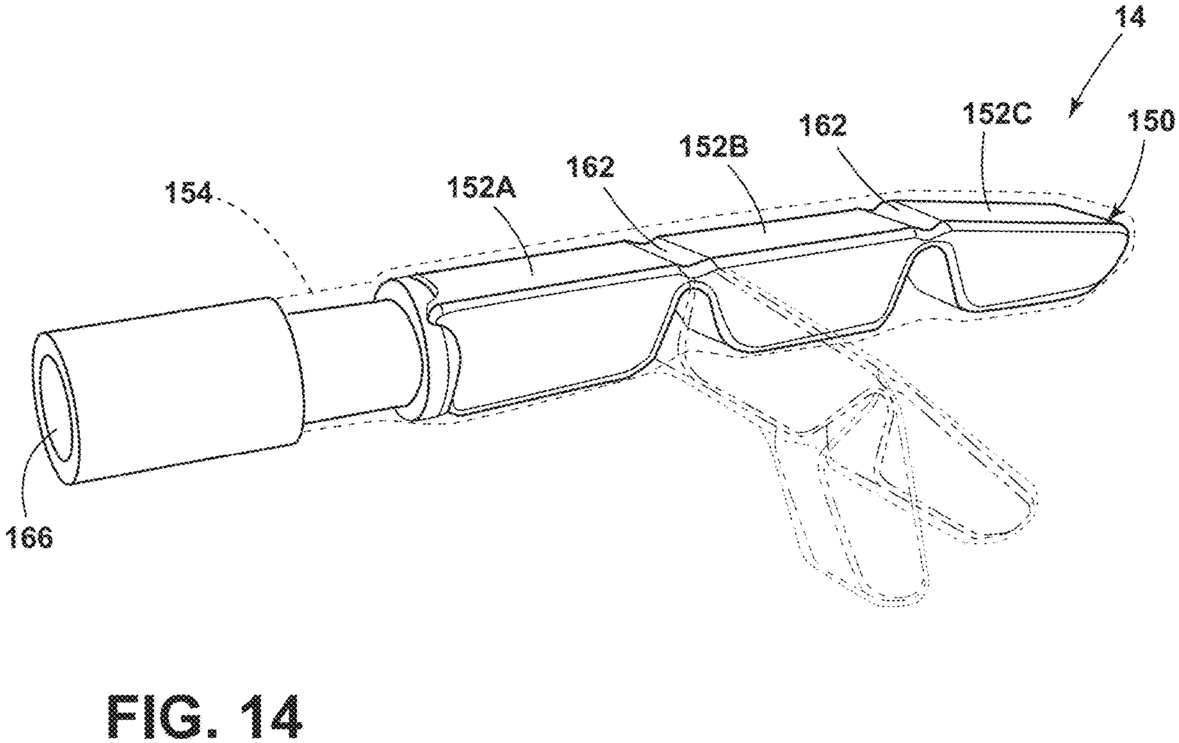
FIG. 14 is a schematic view of the actuator of FIG. 13 moving from the non-deployed state to a deployed state, according to the present disclosure.

Referring to FIGS. 13 and 14, an additional or alternative configuration of the wearable health management system 10 is illustrated, with the actuators 14 configured as soft robotics assemblies 150 that include multiple segments 152. In the illustrated example, the soft robotics assembly 150 includes three segments 152A-152C, collectively referred to as the segments 152, but may include any number of segments 152 based on the length of the soft robotics assembly 150. The segments 152 are disposed within a membrane 154. The segments 152 may be constructed of silicone or another similar material and the membrane 154 may be a plastic film disposed over the segments 152. The segments 152 are generally disposed in a linear arrangement or configuration.

Each segment 152 is generally formed in a triangular or truncated-triangular shape. Accordingly, a first surface 156, generally a top or outer surface, of each segment 152 has a length greater than a length of an opposing second surface 158, which is generally a bottom or inner surface. Angled side surfaces 160 extend between the first surface 156 and the second surface 158. The shape of the segments 152 allows the soft robotics assembly 150 to bend in a certain direction.

The soft robotics assembly 150 is configured to bend at joints 162 defined at an interface between adjacent segments 152. Each joint 162 has a triangular-shaped space formed between angled side surfaces 160 of adjacent segments 152. The segments 152 are configured to adjust into the space, moving the side surfaces 160 of the adjacent segments 152 closer to one another and/or into an abutting relationship with one another.

The segments 152 are arranged within a cavity 164 defined by the membrane 154. The cavity 164 is in fluid communication with the pump 60 via a vacuum port 166. The pump 60 may be a vacuum pump configured to direct fluid out of the cavity 164 defined by the membrane 154. As the pump 60 removes fluid from the cavity 164, the membrane 154 contracts around the segments 152 and compresses the segments 152 into the deployed state based on the shape of the space at the joints 162 between the segments 152.

Referring still to FIGS. 13 and 14, the contraction of the membrane 154 causes the soft robotics assembly 150 to bend at the joints 162 and apply pressure to the patient. The amount of pressure applied to the affected area can be controlled by the amount of bend of the soft robotics assembly 150. The bending of the soft robotics assembly 150 may continue until the side surfaces 160 of the adjacent segments 152 abut one another or the soft robotics assembly 150 may bend to a lesser degree to apply less pressure. The fluid communication between the pump 60 and the membrane 154 may be disrupted, or alternatively, fluid may be directed into the cavity 164 to return the soft robotics assembly 150 to the non-deployed state. The soft robotics assembly 150 having the plurality of segments 152 may mirror the movement and force from manual massage therapy treatments.

The soft robotics assemblies 150 may be arranged around the affected area of the patient to provide massage therapy through selective activation of the soft robotics assembly 150. In various examples, the soft robotics assembly 150, as illustrated in FIGS. 13 and 14, may be integrated into the flexible member 12. The soft robotics assembly 150 may be arranged in an array or matrix along the flexible member 12. The soft robotics assembly 150 may be disposed between two layers of fabric or may be stitched to the flexible member 12. Additionally or alternatively, the flexible member 12 may include pockets for receiving the soft robotics assembly 150. In this way, the soft robotics assembly 150, as illustrated in FIGS. 13 and 14, may be inserted into the flexible member 12 for use and then removed from the flexible member 12. The controller 20 may independently activate each soft robotics assembly 150 to provide pressure in the directional pattern 22 in accordance with the massage therapy protocol, which generally pushes fluid out of a limb and towards the center of the body.

Figure 15:
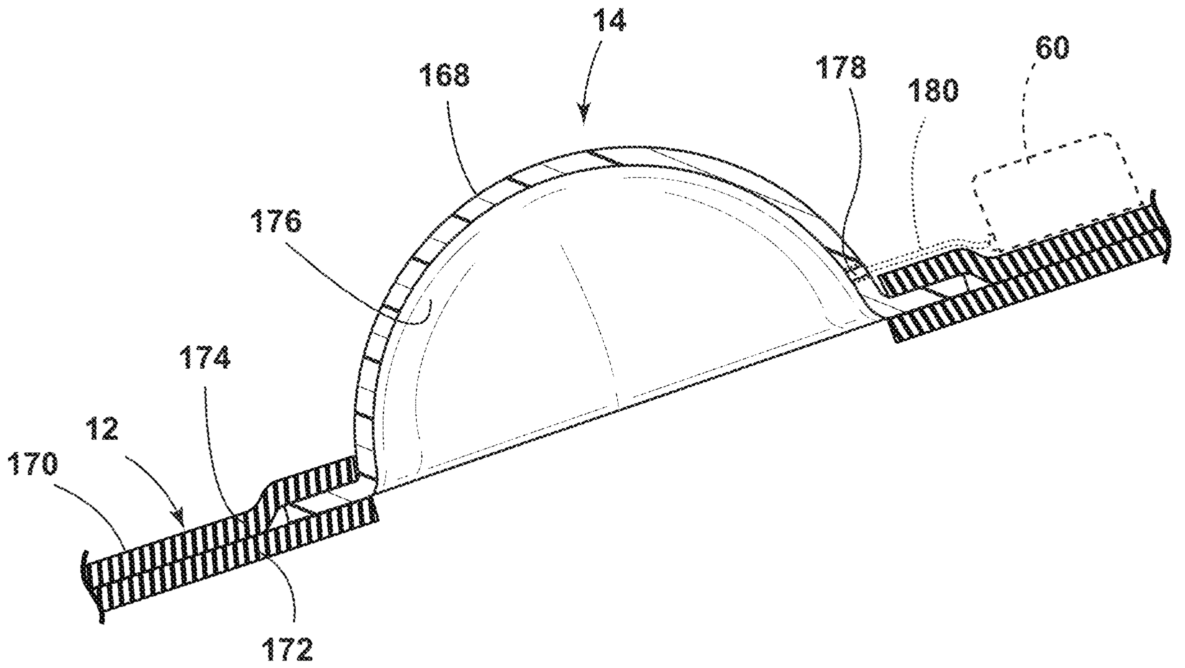
FIG. 15 is a side cross-sectional view of an actuator for applying negative pressure, according to the present disclosure.

Referring to FIG. 15, in an additional or alternative configuration, the actuator 14 is configured as a cupped feature 168 to apply negative pressure to the affected area of the patient. The cupped feature 168 is coupled to the flexible member 12, such as a garment 170. In various examples, the cupped feature 168 extends at least partially between a first layer 172 of fabric or material of the garment 170 and a second layer 174 of fabric or material. The garment 170 may defines holes or apertures in both the first and second layers 172, 174 to receive the cupped feature 168. Alternatively, the first layer 172 may define a hole or aperture, while the second layer extends along the cupped feature 168 and does not define a hole or aperture.

The cupped feature 168 generally defines a recess or cavity 176 that can be placed against the skin of the user. The cupped feature 168 may be a slightly rigid feature that maintains a selected shape or structure when the negative pressure is applied. Each cupped feature 168 generally defines a port 178 configured to engage tubing 180, which fluidly couples the cavity 176 with the pump 60. The pump 60 may direct fluid out of the cavity 176 and consequently cause a negative pressure to be applied to the skin. The negative pressure generally results in the skin of the patient lifting, thereby providing additional space for fluid to move within the body. The negative pressure may stimulate blood flow and lymphatic vessels to move excess fluid within the body.

Once the pump 60 is deactivated, the negative pressure may be removed from the wearer. The cupped feature 168 may be integrated into or coupled with any form of the flexible member 12 disclosed herein. The flexible member 12 may include any practicable number of cupped features 168 that may be independently activated or activated in groups to drive fluid toward the trunk of the body of the wearer. It is also contemplated that the soft robotics assembly 150 and the pump 60 may be configured to provide the negative pressure on the affected area.

Figure 16:
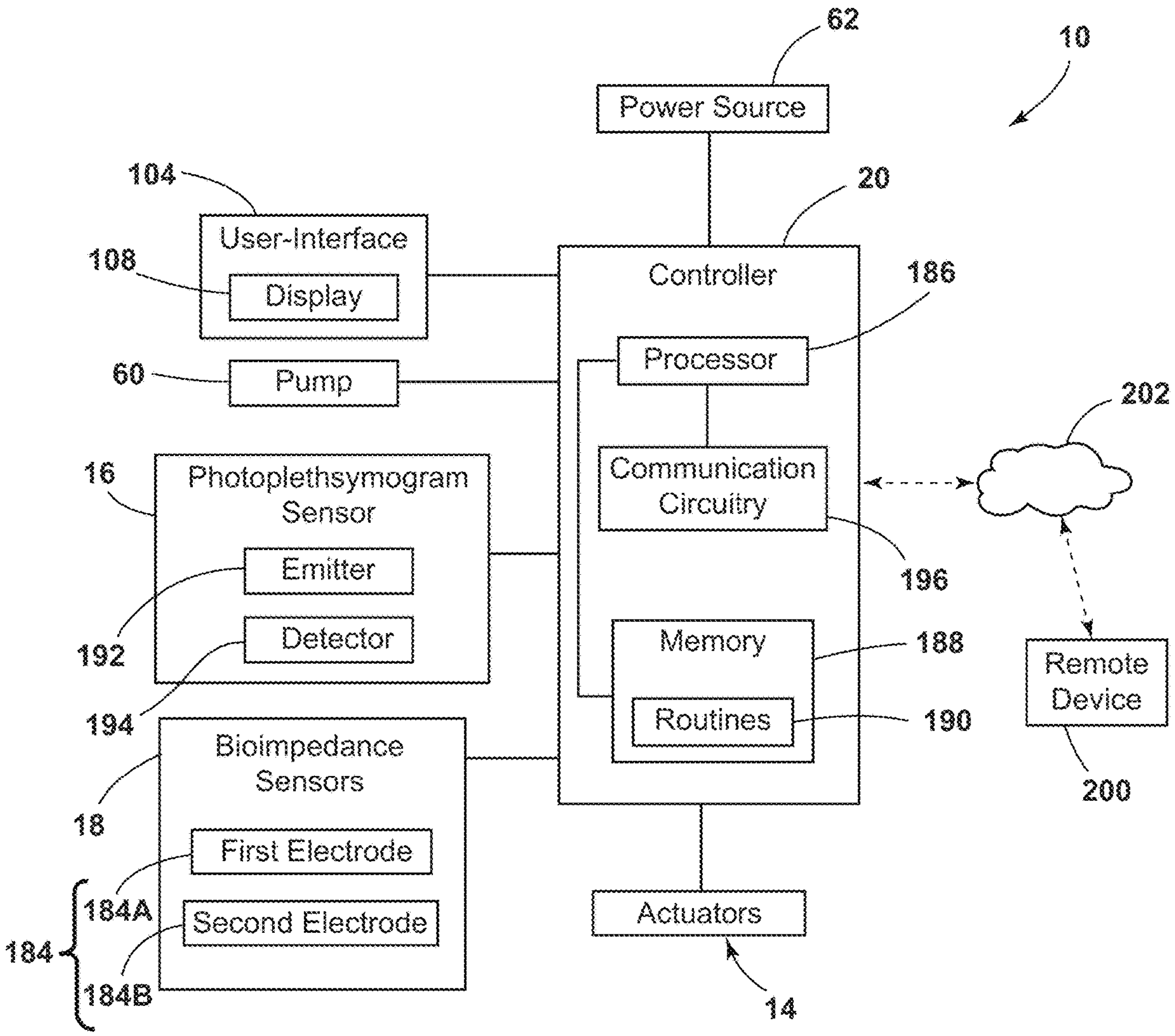
FIG. 16 is a block diagram of a wearable health management system, according to the present disclosure.

Referring to FIG. 16, and with further reference to FIGS. 1-14, the health management system 10 includes the controller 20 communicatively coupled to each actuator 14. The controller 20 includes a processor 186, a memory 188, and other control circuitry. Instructions or routines 190 are stored within the memory 188 and executable by the processor 186. The controller 20 may include one or more routines 190 for adjusting the actuators 14 between the deployed state and the non-deployed state. The controller 20 generally includes one or more routines 190 that relate to massage therapy protocols (e.g., amount of pressure, activation sequence, timing, speed, etc.), which can produce the selected pressure in the directional pattern 22. The controller 20 may include circuitry configured to generate heat, current, voltage, or other attributes to adjust the actuators 14 to the deployed state.

The controller 20 disclosed herein may include various types of control circuitry, digital or analog, and may include the processor 186, a microcontroller, an application specific circuit (ASIC), or other circuitry configured to perform the various input or output, control, analysis, or other functions described herein. The memory 188 described herein may be implemented in a variety of volatile and nonvolatile memory formats. The routines 190 include operating instructions to enable various methods and functions described herein.

The health management system 10 may be configured to obtain one or more metrics regarding the health of the patient. The flexible member 12 may include one or both of the PPG sensor 16 and the BI sensor 18. The PPG sensor 16 is used to determine pulse oximetry to measure the oxygen saturation levels or $SpO_2$ levels of the blood. Generally, the PPG sensor 16 includes an optical sensor having an emitter 192 and a detector 194. The emitter 192 may include a first LED light source configured to emit visible light (e.g., having a wavelength in a range between about 380 nm and about 700 nm), which can be white light (e.g., having a wavelength in a range between about 400 nm and about 700 nm) or red light (e.g., having a wavelength in a range between about 620 nm and about 750 nm) and a second LED light source configured to emit infrared light (e.g., having a wavelength in a range between about 700 nm and about 1050 nm). The two light sources may be advantageous as red light may be primarily absorbed by deoxygenated blood and infrared light may be primarily absorbed by oxygenated blood.

The detector 194 may be a photodiode configured to receive the light emitted by the emitter 192. The PPG sensor 16 is utilized to monitor peaks, often called amplitudes, of the pulse. The metrics and data detected by the PPG sensor 16 are communicated to the controller 20 to determine the percentage of oxygen in the blood. In a non-limiting example, the PPG sensor 16 is disposed proximate a wrist area of the patient to obtain $SpO_2$ data from capillary beds in the wrist area. It is contemplated that the PPG sensor 16 may be disposed adjacent to the chest of the patient or otherwise integrated into the health management system 10.

Additionally or alternatively, the flexible member 12 may include the BI sensor 18. Bioimpedance is a measure of how well the body impedes electrical current flow. Impedance is measured through the application of a small electric current. The change in the measured voltage compared to the input voltage may determine the composition of the measured area. Bioimpedance spectroscopy may be used to measure the impedance of biological tissues at a series of frequencies, which may measure the fluid within cells and fluid outside of cells in the measured area. The fluid levels inside the cell compared to outside the cell may be advantageous for monitoring the condition of the patient. The metrics relating to the fluid levels of the affected area may also be monitored to determine the effectiveness of a massage therapy protocol.

The BI sensor 18 is configured as one or more electrodes 184, which may be incorporated into the fabric of the flexible member 12. The electrodes 184 may be, for example, metal electrodes or gel electrodes. The BI sensor 18 may be placed in contact with the skin of the patient and emit a series of frequencies into the body. One of the electrodes 184A may apply a small electric current to be detected by the other electrode 184B. The power source 62 of the health management system 10 may provide the current for impedance measurement. The voltage received by the second electrode 184B varies based on the biological material through which the current passes (e.g., bone, muscle, fat, etc.). The variance in the voltage received may be utilized by the controller 20 to determine the impedance signal.

The frequencies penetrate certain aspects of the body, but not others. Based on the penetration of the frequencies, the body composition of the patient may be determined. Using the data collected by the BI sensor 18, a fluid level of the affected area can be obtained. Accordingly, utilizing the BI sensor 18, the amount of fluid within cells and outside of the cells can be determined.

Referring still to FIG. 16, the BI sensor 18 may include first or drive electrodes 184A and second or sense electrodes 184B. In a non-limiting example, one electrode 184A may be disposed proximate to the wrist of the patient while a second electrode 184B is disposed proximate to the shoulder to measure the impedance of the arm. In another non-limiting example, one electrode 184A may be disposed proximate to the hip of the patient and the second electrode 184B may be disposed proximate to the foot to measure the impedance of the leg. In an additional non-limiting example, one electrode 184A may be disposed proximate a right side of the chest and the second electrode 184B may be disposed proximate the left side of the chest to measure the impedance across the chest. The electrodes 184 of the BI sensor 18 are generally disposed in contact with the skin to obtain the impedance measurement, which is communicated to the controller 20. The electrodes 184 may be integrated into the flexible member 12 or otherwise associated with the health management system 10.

The data obtained by the PPG sensor 16 and the BI sensor 18 can be obtained for each affected area. The data obtained by the PPG sensor 16 and the BI sensor 18 may be used to determine various metrics, such as blood oxygen levels and fluid levels of the body. These metrics can be monitored to determine whether massage therapy is needed and whether or not certain massage therapy protocols are effective. Sensing the amount of fluid using bioimpedance allows for the health management system 10 to determine the amount of time needed to spend using the therapy device for treatment. This creates an individualized treatment plan as each patient can range in severity in the condition and when or how often the condition flares up. Each of the PPG sensor 16 and the BI sensor 18 may measure a single limb or the torso independently to find the metrics of the specific measured area. The PPG sensor 16 and the BI sensor 18 provide a method for dynamically monitoring the circulating blood pulse profile and fluid level in affected body areas.

The controller 20 may include one or more routines 190 relating to the control of the PPG sensor 16 and BI sensor 18. The controller 20 may initiate when the health metrics are obtained from the patient. The controller 20 is configured to receive the data from the PPG sensor 16 and the BI sensor 18 and may utilize the received data to determine various health metrics of the patient, including fluid levels and blood oxygen levels.

Referring still to FIG. 16, the controller 20 includes communication circuitry 196 configured to communicate with a remote device 200 included in the health management system 10. The controller 20 may communicate with the remote device 200 and/or remote servers (e.g., cloud servers, Internet-connected databases, computers, etc.) via a communication interface 202. The communication interface 202 may be a network having one or more various wired or wireless communication mechanisms, including any combination of wired (e.g., cable and fiber) or wireless communications and any network topology or topologies.

Exemplary communication networks include wireless communication networks, such as, for example, Bluetooth®, ZigBee®, Wi-Fi, IrDA, RFID, etc. The controller 20 and the remote device 200 may include circuitry configured for bi-directional wireless communication. Additional exemplary communication networks include local area networks (LAN) and/or wide area networks (WAN), including the Internet and other data communication services. It is contemplated that the controller 20 and the remote device 200 may communicate by any suitable technology for exchanging data.

The remote device 200 may be a remote handheld unit such as, for example, a phone, a tablet, a portable computer, a wearable device, etc. In a non-limiting example, the remote device 200 may be associated with a medical professional through a patient database system. Information relating to the massage protocols and/or the obtained metrics may be communicated through the communication interface 202 to the patient database system. The medical professional may also assign massage protocols based on the received data through the communication interface 202.

Referring still to FIG. 16, the remote device 200 may belong to the patient, thereby allowing the patient to monitor his or her lymphedema and/or DVT. The remote device 200 may allow the patient to view and monitor health metrics, including fluid levels and blood oxygen levels. The remote device 200 may also allow the patient to monitor when massage therapy should be performed and how effective the massage therapy protocol is. The patient may control the activation of the massage therapy protocol and make adjustments to the massage therapy protocol through the remote device 200. Accordingly, the patient may control the actuators 14 through the remote device 200 (e.g., a user input). Moreover, the user may monitor the health data and the massage therapy protocols via the remote device 200.

Referring to FIGS. 1-16, it is contemplated that the flexible member 12 may be worn with or without the rigid outer shell 32, 72. In a non-limiting example, as best illustrated in FIGS. 1 and 2, the rigid outer shell 32, 72 may include the actuators 14, and the flexible member 12 may be free of the actuators 14. Alternatively, as best illustrated in FIGS. 3-14, the flexible member 12 may include the actuators 14. In an additional non-limiting example, the flexible member 12 and the rigid outer shell 32, 72 may both include the actuators 14. Each of the actuators 14 disclosed herein may the integrated into the flexible member 12, coupled to the flexible member 12, coupled to the rigid outer shell 32, coupled to the rigid outer shell 72, or otherwise arranged adjacent to the skin of the patient. Having the actuators 14 adjacent to the skin of the patient reduces any impeding of the massage therapy for directing fluids to the circulatory system. Any configuration of the flexible member 12 may be used in combination with the PPG sensor 16 and/or the BI sensor 18.

The wearer may place the wearable health management system 10 on the affected area. The configuration of the wearable health management system 10 may provide convenient application and removal of the wearable health management system 10 over the affected area. The wearer may activate the actuators 14. The actuators 14 are configured to apply pressure in accordance with a selected massage therapy protocol. Generally, the massage therapy protocol provides for sequential activation of the actuators 14 in the directional pattern 22 that derived fluid in a distal to proximal direction toward the trunk of the body to be processed.

Use of the present device may provide for a variety of advantages. For example, the connection features 40 on the cuff 30 and the cuff 70 may help the patient quickly remove the wearable health management system 10. The connection features 40 may also provide quicker and easier ways for the health management system 10 to be applied to the affected area. Additionally, the health management system 10 provides a smaller, lighter, and less bulky system to provide treatment for lymphedema or DVT, as well as other similar conditions. Further, the health management system 10 may provide a method of dynamically applying pressure to the affected area and/or dynamically adjusting the pressure to the affected area. Also, the health management system 10 may utilize massage therapy protocols that mirror manual massage therapy. Further, the patient may control the health management system 10 via the remote device 200.

Additionally, use of the PPG sensor 16 or the BI sensor 18 provides a method of dynamically monitoring the circulating blood pulse profile and fluid level in affected body areas, which can allow for monitoring of changes in the obtained metrics, the efficiency of the massage therapy protocol, and when the massage therapy is needed. Sensing the amount of fluid in the affected area using the BI sensor 18 may allow the patient or medical professional to determine the amount of time needed using the therapy device for treatment. As such, an individualized treatment plan may be developed for each patient based on the severity of the condition being treated, as well as when or how often the condition flares up. Additionally, the patient and/or a medical professional may adjust the pressure applied to the affected area in response to the blood pulse profile and the fluid levels. Moreover, the actuators 14 may be integrated into the flexible member 12 and operate as artificial muscles that can be worn by the patient to apply compression to the affected area. Additional benefits or advantages of this device may also be realized in/or achieved.

The device disclosed herein is further summarized in the following paragraphs and is further characterized by combinations of any and all of the various aspects described therein.

According to at least one aspect of the present disclosure, a wearable health management system includes a flexible member configured to be worn on an affected area by a patient. At least one actuator is operably coupled to the flexible member. The at least one actuator is configured to be adjusted between a deployed state and a non-deployed state. At least one of a photoplethysmogram sensor and a bio-impedance sensor is coupled to the flexible member to obtain one or more health metrics from the patient. A controller is in communication with the at least one actuator. The controller is configured to adjust the at least one actuator to the deployed state to provide a selected pressure to the affected area.

According to another aspect, at least one actuator includes a plurality of actuators arranged along a flexible member. A controller is configured to adjust the plurality of actuators to provide a selected pressure in a directional pattern.

According to another aspect, a controller is configured to communicate with a remote device to receive an input to control at least one actuator.

According to another aspect, at least one actuator is a cable that extends along an affected area.

According to another aspect, at least one actuator is a supercoiled polymer assembly configured to be adjusted to a deployed state in response to heat.

According to another aspect, at least one actuator includes a dielectric polymer and a conductive layer configured to compress to a deployed state.

According to another aspect, a vacuum pump is included. At least one actuator includes a plurality of segments disposed adjacent to one another within a cavity defined by a membrane. The vacuum pump is configured to remove fluid from the cavity, and consequently, adjust the at least one actuator to a deployed state.

According to another aspect, a vacuum pump is included. At least one actuator includes a cupped feature defining a cavity. The vacuum pump is configured to remove fluid from the cavity. The selected pressure is a negative pressure applied to an affected area.

According to another aspect of the present disclosure, a cuff for a patient includes a wearable flexible member. A rigid outer shell is disposed on an outer surface of the wearable flexible member. A plurality of actuators is operably coupled to at least one of the wearable flexible member and the rigid out shell. Each actuator is adjustable between a deployed state and a non-deployed state. A connection feature is coupled to the rigid outer shell. The connection feature is configured to retain the cuff in a selected position on an affected area. A controller is configured to adjust each actuator between the deployed state and the non-deployed state. The controller is configured to sequentially adjust the plurality of actuators to the deployed state to provide pressure in a directional pattern.

According to another aspect, a connection feature is configured as a strap extending from a first edge of a rigid outer shell, and a buckle is coupled to a second edge of the rigid outer shell.

According to another aspect, a pump is included. A plurality of actuators is configured as bladders in fluid communication with the pump.

According to another aspect, a housing is coupled to the rigid outer shell. A pump and a power source are disposed within the housing. A user interface is coupled to the rigid outer shell and in communication with a controller.

According to another aspect, a rigid outer shell includes a continuous surface and elongate supports coupled to the continuous surface via the connection feature.

According to another aspect, the connection feature is configured as an elastically deformable band.

According to another aspect, a garment for providing treatment includes a first layer and a second layer coupled to the first layer. The first layer and the second layer are configured to be worn over an affected area. An actuator is disposed between the first layer and the second layer. The actuator is operable between a deployed state and a non-deployed state. A controller is communicatively coupled to the actuator and configured to adjust the actuator between the deployed state and the non-deployed state.

According to another aspect, an actuator is a soft robotics assembly having a plurality of segments disposed in a linear configuration within a membrane. The soft robotics assembly is configured to bend to a deployed state.

According to another aspect, an actuator is a chamber defined between a first layer and a second layer. The chamber is in fluid communication with a pump to be adjusted between the deployed state and the non-deployed state.

According to another aspect, an actuator is a supercoiled polymer assembly having a supercoiled polymer, a conductive member, and a heat resistant feature. The conductive member is configured to transfer heat to the supercoiled polymer to adjust the supercoiled polymer to the deployed state.

According to another aspect, an actuator is an electro-activated actuation assembly having a dielectric polymer disposed between conductive layers. The electro-activated actuation assembly is configured to compress to a deployed state in response to a predefined voltage.

According to another aspect, a photoplethysmogram sensor is coupled to at least one of a first layer and a second layer to obtain photoplethysmogram data. A bioimpedance sensor is coupled to at least one of the first layer and the second layer to obtain impedance data.

A means for managing health that includes a means for wearing the means for managing health on an affected area. A means for actuating is coupled to the means for wearing. The means for actuating is configured to be adjusted between a deployed state and a non-deployed state. A means for obtaining metrics includes at least one of a photoplethysmogram sensor and a bioimpedance sensor coupled to the means for wearing. A means for controlling is in communication with the means for actuating. The means for controlling is configured to adjust the means for actuating to the deployed state to provide a selected pressure to the affected area.

Related applications, for example those listed herein, are fully incorporated by reference. Descriptions within the related applications are intended to contribute to the description of the information disclosed herein as may be relied upon by a person of ordinary skill in the art. Any changes between any of the related applications and the present disclosure are not intended to limit the description of the information disclosed herein, including the claims. Accordingly, the present application includes the description of the information disclosed herein as well as the description of the information in any or all of the related applications.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A wearable health management system, comprising:

a flexible member configured to be worn on an affected area by a patient;

at least one actuator operably coupled to the flexible member, the at least one actuator configured to be adjusted between a deployed state and a non-deployed state;

a vacuum pump, wherein the at least one actuator is a soft robotics assembly and includes a plurality of segments disposed adjacent to one another within a cavity defined by a membrane, and wherein the vacuum pump is configured to remove fluid from the cavity, and consequently, adjust the at least one actuator to the deployed state, wherein the plurality of segments are disposed in a linear configuration within the membrane, and wherein the soft robotics assembly is configured to bend to the deployed state;

at least one of a photoplethysmogram sensor and a bioimpedance sensor coupled to the flexible member to obtain one or more health metrics from the patient; and a controller in communication with the at least one actuator, wherein the controller is configured to adjust the at least one actuator to the deployed state to provide a selected pressure to the affected area.

2. The wearable health management system of claim 1, wherein the at least one actuator includes a plurality of actuators arranged along the flexible member, and wherein the controller is configured to adjust the plurality of actuators to provide the selected pressure in a directional pattern.

3. The wearable health management system of claim 1, wherein the controller is configured to communicate with a remote device to receive an input to control the at least one actuator.

4. The wearable health management system of claim 1, wherein each of the photoplethysmogram sensor and the bioimpedance sensor is coupled to the flexible member, and wherein the photoplethysmogram sensor includes an emitter having a first light source configured to emit visible light and a second light source configured to emit infrared light and a detector configured to receive the visible light and the infrared light of the emitter, and further wherein the bioimpedance sensor includes drive electrodes and sense electrodes.

5. The wearable health management system of claim 1, wherein the at least one actuator includes multiple actuators configured as soft robotics assemblies, and wherein the controller is configured to independently activate each soft robotics assembly to provide pressure in a directional pattern.

6. The wearable health management system of claim 1, wherein a space is defined between side surfaces of adjacent segments of the plurality of segments, and wherein the side surfaces are in an abutting relationship with one another when the at least one actuator is in the deployed state.

7. The wearable health management system of claim 1, wherein the membrane is configured to contract around the plurality of segments to cause the at least one actuator to bend at joints between adjacent segments of the plurality of segments in response to the vacuum pump removing the fluid from the cavity.

8. The wearable health management system of claim 1, wherein the fluid is directed into the cavity of the membrane to adjust the at least one actuator to the non-deployed state.

9. The wearable health management system of claim 1, wherein fluid communication between the vacuum pump and the cavity is disrupted to adjust the at least one actuator to the non-deployed state.

10. The wearable health management system of claim 5, wherein the flexible member includes pockets for receiving the soft robotics assemblies.

11. A garment for providing treatment, comprising:

a first layer;

a second layer coupled to the first layer, wherein the first layer and the second layer are configured to be worn over an affected area;

an actuator disposed between the first layer and the second layer, wherein the actuator is operable between a deployed state and a non-deployed state, and wherein the actuator is a soft robotics assembly including:

a membrane defining a cavity;

segments disposed within the cavity; and a vacuum pump in fluid communication with the cavity via a vacuum port, wherein the vacuum pump is configured to vacuum fluid from the cavity and, consequently, contract the membrane around the segments and adjust the segments to the deployed state, wherein the segments are disposed in a linear configuration within the membrane, and wherein the soft robotics assembly is configured to bend to the deployed state; and a controller communicatively coupled to the actuator and configured to adjust the actuator between the deployed state and the non-deployed state.

12. The garment of claim 11, further comprising:

a photoplethysmogram sensor coupled to at least one of the first layer and the second layer to obtain photoplethysmogram data; and a bioimpedance sensor coupled to at least one of the first layer and the second layer to obtain impedance data.

13. The garment of claim 11, wherein each segment has an outer surface, an inner surface, and angled side surfaces extending between the outer surface and the inner surface, and wherein a length of the outer surface is greater than a length of the inner surface, and further wherein a joint is defined at each interface between adjacent segments, each joint defining a space between the angled side surfaces of the adjacent segments.

14. The garment of claim 13, wherein the space between the angled side surface of one of the segments and the angled side surface of an adjacent one of the segments is smaller when the soft robotics assembly is in the deployed state.

15. The garment of claim 13, wherein the angled side surface of one of the segments abuts the angled side surface of an adjacent one of segments when the soft robotics assembly is in the deployed state.

16. The garment of claim 11, further comprising:

a bioimpedance sensor coupled to at least one of the first layer and the second layer, wherein the bioimpedance sensor includes a drive sensor for applying an electric current and a sense electrode.

17. The garment of claim 11, further comprising:

a photoplethysmogram sensor coupled to at least one of the first layer and the second layer to obtain photoplethysmogram data.

18. The garment of claim 17, wherein the photoplethysmogram sensor includes an emitter having a first light source configured to emit visible light and a second light source configured to emit infrared light and a detector configured to receive the visible light and the infrared light of the emitter.

19. The garment of claim 11, wherein the segments are constructed of silicone.

* * * * *